US011037378B2

(12) United States Patent
Wells et al.

(10) Patent No.: US 11,037,378 B2
(45) Date of Patent: Jun. 15, 2021

(54) METHOD AND SYSTEM FOR CREATING DRIVER TELEMATIC SIGNATURES

(71) Applicants: Mark A. Wells, San Diego, CA (US); Neil G. Chan, Victoria (CA); Travis R. Brooks, La Mesa, CA (US)

(72) Inventors: Mark A. Wells, San Diego, CA (US); Neil G. Chan, Victoria (CA); Travis R. Brooks, La Mesa, CA (US)

(73) Assignee: IGEN Networks Corp., San Diego, CA (US)

( * ) Notice: Subject to any disclaimer, the term of this patent is extended or adjusted under 35 U.S.C. 154(b) by 38 days.

(21) Appl. No.: 16/387,858

(22) Filed: Apr. 18, 2019

(65) Prior Publication Data
US 2020/0334924 A1 Oct. 22, 2020

(51) Int. Cl.
| | |
|---|---|
| *G07C 5/00* | (2006.01) |
| *G06F 16/25* | (2019.01) |
| *G06Q 40/08* | (2012.01) |
| *H04W 4/44* | (2018.01) |
| *G07C 5/02* | (2006.01) |
| *H04L 29/08* | (2006.01) |
| *G06N 5/02* | (2006.01) |

(52) U.S. Cl.
CPC ........... *G07C 5/008* (2013.01); *G06F 16/254* (2019.01); *G06N 5/02* (2013.01); *G06Q 40/08* (2013.01); *G07C 5/02* (2013.01); *H04L 67/10* (2013.01); *H04W 4/44* (2018.02)

(58) Field of Classification Search
CPC . G07C 5/008; G07C 5/02; H04W 4/44; G06F 16/254; G06N 5/02; G06Q 40/08; H04L 67/10; G05D 1/0088; G05D 1/0276; G05D 1/0268
See application file for complete search history.

(56) References Cited

U.S. PATENT DOCUMENTS

| | | | |
|---|---|---|---|
| 5,311,197 A | 5/1994 | Sorden et al. | |
| 5,797,134 A | 8/1998 | McMillan et al. | |
| 5,974,312 A | 10/1999 | Hayes, Jr. et al. | |
| 6,031,828 A | 2/2000 | Koro et al. | |

(Continued)

FOREIGN PATENT DOCUMENTS

WO WO2019/213177 A1 * 7/2019

*Primary Examiner* — Joseph L Greene
(74) *Attorney, Agent, or Firm* — Lesavich High-Tech Law Group, S.C.; Stephen Lesavich

(57) ABSTRACT

A method and system for creating driver telematic signatures. The driver telematic signatures include device-independent and vehicle-independent, artificial intelligence (AI) analyzed and dynamic Big Data set (e.g., 100,000–1 Million+ data values) calibrated, driver safety scoring system. The driver telematics signatures are created and used in real-time from a cloud Software as a Service (SaaS) on a cloud server network device and a cloud communications network that communicates with a driver's vehicle when it is on and moving. The driver telematics signatures provide current driver performance data, driver habit data and allow determination in real-time of drivers performing risky driver maneuvers. The driver telematics signature are also used to determine a cost of insurance for vehicles as the result of reducing rating errors by establishing a baseline for the driver's behavior while driving a vehicle.

20 Claims, 16 Drawing Sheets

(56) References Cited

U.S. PATENT DOCUMENTS

| | | |
|---|---|---|
| 6,295,449 B1 | 9/2001 | Westerlage et al. |
| 6,314,270 B1 | 11/2001 | Uchida |
| 6,529,723 B1 | 3/2003 | Bentley |
| 6,665,613 B2 | 12/2003 | Duvall |
| 6,862,524 B1 | 3/2005 | Nagda et al. |
| 6,922,547 B2 | 7/2005 | O'Neill et al. |
| 6,934,544 B2 | 8/2005 | Cooper et al. |
| 7,133,127 B2 | 9/2006 | Banet et al. |
| 7,196,621 B2 | 3/2007 | Kochis |
| 7,339,469 B2 | 3/2008 | Braun |
| 7,408,502 B2 | 8/2008 | Percy et al. |
| 7,451,042 B2 | 11/2008 | Uyeki et al. |
| 7,480,563 B2 | 1/2009 | Ichimura |
| 7,484,663 B2 | 2/2009 | Olsen, III et al. |
| 7,519,463 B2 | 4/2009 | Olsen, III et al. |
| 7,538,667 B2 | 5/2009 | Koen |
| 7,877,198 B2 | 1/2011 | Tenzer et al. |
| 7,940,173 B2 | 5/2011 | Koen |
| 8,024,118 B2 | 9/2011 | Bradley et al. |
| 8,031,114 B2 | 10/2011 | Kellermeier et al. |
| 8,234,168 B1 | 7/2012 | Lagle Ruiz et al. |
| 8,311,889 B1 | 11/2012 | Lagle Ruiz et al. |
| 8,339,251 B2 | 12/2012 | Roberts, Sr. et al. |
| 8,392,538 B1 | 3/2013 | Lee |
| 8,463,765 B2 | 6/2013 | Lesavich |
| 8,495,489 B1 | 7/2013 | Everingham |
| 8,558,678 B2 | 10/2013 | Van Wiemeersch et al. |
| 8,587,420 B2 | 11/2013 | Koen |
| 8,599,003 B2 | 12/2013 | Roberts, Sr. et al. |
| 8,626,344 B2 | 1/2014 | Imes et al. |
| 8,670,933 B2 | 3/2014 | Schenken et al. |
| 8,688,313 B2 | 4/2014 | Margol et al. |
| 8,744,678 B2 | 6/2014 | Becher et al. |
| 8,766,791 B2 | 7/2014 | Koen et al. |
| 8,810,454 B2 | 8/2014 | Cosman |
| 8,823,502 B2 | 9/2014 | Berkobin et al. |
| 8,880,239 B2 | 11/2014 | Kleve et al. |
| 8,896,440 B2 | 11/2014 | Saeedi et al. |
| 8,971,873 B2 | 3/2015 | Yi et al. |
| 9,007,473 B1 | 4/2015 | Worley, III |
| 9,037,564 B2 | 5/2015 | Lesavich et al. |
| 9,066,464 B2 | 6/2015 | Schmidt et al. |
| 9,084,118 B2 | 7/2015 | Oesterling |
| 9,137,250 B2 | 9/2015 | Lesavich et al. |
| 9,158,747 B2 | 10/2015 | Lee |
| 9,311,598 B1* | 4/2016 | Bansal .................... H04L 67/10 |
| 9,361,479 B2 | 6/2016 | Lesavich et al. |
| 9,373,086 B1 | 6/2016 | Allen et al. |
| 9,418,491 B2 | 8/2016 | Phillips |
| 9,569,771 B2* | 2/2017 | Lesavich ............. G06Q 20/382 |
| 9,988,058 B2 | 6/2018 | Phillips |
| 10,026,506 B1* | 7/2018 | LaBorde .............. G05D 1/0088 |
| 10,065,653 B1 | 9/2018 | Phillips |
| 10,510,193 B2 | 12/2019 | Wells et al. |
| 10,655,973 B2* | 5/2020 | Khasis ........... G06Q 10/063114 |
| 10,796,317 B2 | 10/2020 | Wells |
| 10,896,429 B2 | 1/2021 | Wells |
| 2003/0227395 A1 | 12/2003 | Zeineh |
| 2004/0012506 A1 | 1/2004 | Fujiwara et al. |
| 2006/0061469 A1 | 3/2006 | Jaeger et al. |
| 2006/0109106 A1 | 5/2006 | Braun |
| 2006/0187026 A1 | 8/2006 | Kochis |
| 2006/0200305 A1 | 9/2006 | Sheha et al. |
| 2006/0220842 A1 | 10/2006 | Breed |
| 2006/0238347 A1 | 10/2006 | Parkinson et al. |
| 2007/0156324 A1 | 7/2007 | Percy et al. |
| 2007/0176771 A1 | 8/2007 | Doyle |
| 2007/0185728 A1 | 8/2007 | Schwarz |
| 2007/0219715 A1 | 9/2007 | Uyeki et al. |
| 2008/0094209 A1 | 4/2008 | Braun |
| 2008/0162034 A1 | 7/2008 | Breen |
| 2008/0186162 A1 | 8/2008 | Rajan et al. |
| 2008/0231446 A1 | 9/2008 | Cresto |
| 2009/0140886 A1 | 6/2009 | Bender |
| 2010/0042940 A1 | 2/2010 | Monday et al. |
| 2011/0037620 A1 | 2/2011 | Paun |
| 2011/0208710 A1 | 10/2011 | Lesavich |
| 2011/0280447 A1 | 11/2011 | Conwell |
| 2011/0295724 A1 | 12/2011 | Hill |
| 2012/0278622 A1 | 11/2012 | Lesavich et al. |
| 2013/0144771 A1 | 6/2013 | Boling |
| 2014/0149454 A1 | 5/2014 | Eid |
| 2014/0189792 A1 | 7/2014 | Lesavich et al. |
| 2014/0195663 A1 | 7/2014 | Hirschenberger |
| 2015/0095156 A1 | 4/2015 | Sauerbrey |
| 2015/0230053 A1 | 8/2015 | Scellato |
| 2015/0302421 A1 | 10/2015 | Caton |
| 2015/0379301 A1 | 12/2015 | Lesavich et al. |
| 2016/0049014 A1 | 2/2016 | Phillips |
| 2016/0092959 A1 | 3/2016 | Gross |
| 2016/0225115 A1 | 8/2016 | Levy |
| 2016/0229404 A1 | 8/2016 | Byun |
| 2016/0321654 A1 | 11/2016 | Lesavich et al. |
| 2016/0347325 A1 | 12/2016 | Phillips |
| 2017/0017734 A1 | 1/2017 | Groh |
| 2017/0262863 A1 | 9/2017 | Wells |
| 2017/0364821 A1* | 12/2017 | Mathur .............. G01C 21/3484 |
| 2018/0260822 A1 | 9/2018 | Wells |
| 2018/0273049 A1 | 9/2018 | Phillips |
| 2018/0357221 A1* | 12/2018 | Galitsky .............. G06F 40/205 |
| 2019/0009788 A1 | 1/2019 | Phillips |
| 2020/0062274 A1* | 2/2020 | Kowal .................. G07C 5/008 |
| 2021/0027309 A1 | 1/2021 | Wells |

\* cited by examiner

START

RECEIVING A FIRST SET OF ONE OR MORE WIRELESS MESSAGES ON A CLOUD SOFTWARE AS A SERVICE (SAAS) ON A CLOUD SERVER NETWORK DEVICE WITH ONE OR MORE PROCESSORS VIA A CLOUD COMMUNICATIONS NETWORK FROM A VEHICLE, WHEREIN THE FIRST SET OF ONE OR MORE WIRELESS MESSAGE IS SENT FROM: (1) A FIRST NETWORK DEVICE WITH ONE OR MORE PROCESSORS PLUGGED INTO A PORT ON THE VEHICLE, OR (2) FROM A SECOND NETWORK DEVICE WITHIN THE VEHICLE WITH ONE OR MORE PROCESSORS, WHEREIN THE VEHICLE IS TURNED ON AND IS MOVING — 160

CREATING IN REAL-TIME WITH THE SAAS ON THE CLOUD SERVER NETWORK DEVICE A FIRST DRIVER TELEMETRIC SIGNATURE INCLUDING A FIRST SET OF A PLURALITY OF TELEMETRIC VALUES FOR A DRIVER OF THE VEHICLE, THE FIRST DRIVER TELEMETRIC SIGNATURE CREATED WITH THE INFORMATION FROM FIRST SET OF ONE OR MORE MESSAGES, WITH AN INITIAL BIG DATA SET WITH X-NUMBER OF SET MEMBERS, WHEREIN X IS A POSITIVE NUMBER GREATER THAN AT LEAST 100,000, AND WITH A PLURALITY OF BIG DATA SET ANALYTIC METHODS, THE INITIAL BIG DATA SET INCLUDING A PLURALITY OF INITIAL DRIVER TELEMETRIC SIGNATURE INFORMATION VALUES CREATED WITH THE PLURALITY OF BIG DATA SET ANALYTIC METHODS COMPRISING: PREDICTIVE ANALYTIC METHODS, DRIVER BEHAVIOR ANALYTIC METHODS, VEHICLE PERFORMANCE ANALYTIC METHODS, WEATHER ANALYTIC METHODS, ROAD CONDITION ANALYTIC METHODS, TERRAIN ANALYTIC METHODS AND CULTURAL ANALYTIC METHOD, THE METHODS COMPUTING VALUES FOR THE INITIAL BIG DATA SET WITH THE X-NUMBER OF SET MEMBERS — 162

TO A
FIG. 9B

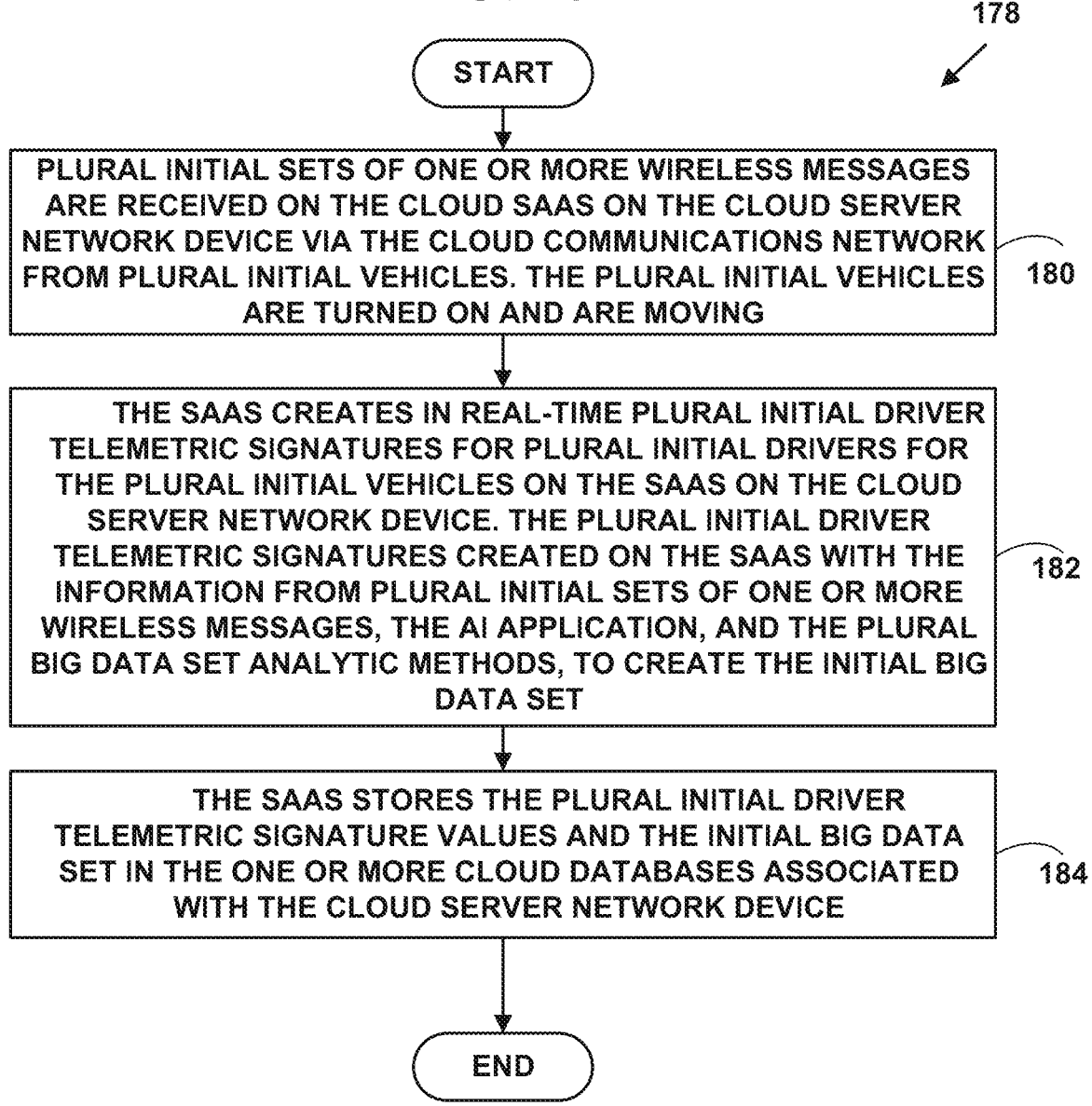

DRIVER TELEMERTIC SIGNATURE
BIG DATA
VISUAL DISPLAY

METHOD AND SYSTEM FOR CREATING DRIVER TELEMATIC SIGNATURES

CROSS REFERENCES TO RELATED APPLICATIONS

Not applicable.

FIELD OF INVENTION

This application relates to the behavior of drivers driving vehicles. More specifically, it relates to a method and system for creating driver telematic signatures, that normalizes and establishes a standard baseline for measuring driver behavior that is device and vehicle independent.

BACKGROUND OF THE INVENTION

A "habit" is an acquired behavior pattern regularly followed until it has becomes involuntary. Many drivers of vehicles start driving at a very early age (e.g., 16, etc.) and develop regularly followed driving habits that are practiced each and every time they drive a vehicle.

For automobile insurers, driver telematics represent a way to quantify risks associated with driver driving specific vehicles. Instead of making insurance pricing and safety decisions on vehicle and driver characteristics, driver telematics gives the automobile insurer and a driver's parents, guardian, spouse, etc. an opportunity to measure a quantity and quality of a driver's behavior. This can lead to savings for safe or infrequent drivers, and transition the burden to insurance policies that represent increased liability for drivers exhibiting risky behaviors while driving.

Statistical evidence supports the argument that drivers perform better and follow safer practices when enrolled in a usage based insurance program, with the understanding that their driving performance is being analyzed. With driver behavior monitoring technology, good driving behavior can be supported in a number of different ways in this type of program, reinforcing habits that can lower the frequency and severity of accidents and claims. For example, if feedback from an On-board diagnostics (OBD) device, or smartphone application can point out to a driver that his or her late-braking behavior is likely to result in rear-ending another vehicle, the driver will often respond to this information by changing this behavior and braking earlier. Recognizing problem driving behaviors and their corresponding relationship to accidents can be a strong motivator to improve driver behavior.

As another example, speeding is a driving behavior frequently associated with younger, inexperienced drivers. Using an event data recorder that generated in-vehicle alerts to a driver who was speeding and parent notifications of young driver who were speeding reduced a rate of safety-relevant events over 70% in one study. Incidences of speeding by young drivers on routes with fatalities were also reduced by about 15%.

By identifying problems with driver behavior, insurers and others are then able to address a root cause of a driving problem. For example, if the data shows that a driver has repeated instances of harsh acceleration and then braking, the insurer might conclude that tailgating or distracted driving is an underlying driving issue. After identifying the cause of the driving problem, the insurer and others can then take steps (i.e., notifications, providing information about distracted driving, etc.) to change driving behavior before it leads to a serious incident on the road.

Better driving habits generally minimizes a severity of accidents when they do occur. Less severe accidents diminish the chances of personal injury and disability claims, one of the most expensive propositions for insurers. So, making positive changes in driving behavior is an important step in cutting the severity of automotive accidents. Such driving habits can be recorded within a vehicle from an On-board diagnostics (OBD) device.

"On-board diagnostics (OBD)" is a term referring to a vehicle's self-diagnostic and reporting capability. OBD systems give the vehicle owner or repair technician access to the status of the various vehicle sub-systems. The amount of diagnostic information available via OBD has varied widely since its introduction in the early 1980s' versions of on-board vehicle computers. Early versions of OBD would simply illuminate a malfunction indicator light if a problem was detected but would not provide any information as to the nature of the problem. Modern OBD implementations use a standardized digital communications port to provide real-time data in addition to a standardized series of diagnostic trouble codes (DTCs), which allow one to rapidly identify and remedy malfunctions within the vehicle.

All cars manufactured after 1996 are required to have an OBD-2 port. The OBD-2 standard specifies the type of diagnostic connector and its pin locations, the electrical signaling protocols available, and the messaging format. It also provides a candidate list of vehicle parameters to monitor along with how to encode the data for each. There is a pin in the connector that provides power for the scan tool from the vehicle battery, which eliminates the need to connect a scan tool to a power source separately. However, some technicians might still connect the scan tool to an auxiliary power source to protect data in the unusual event that a vehicle experiences a loss of electrical power due to a malfunction. As a result of this standardization, a device such as a wireless application can query the on-board computer(s) in any vehicle via the OBD-2.

OBD-2 ports have been routinely been used for safety purposes. Such OBD-2 devices are used to monitor driving habits, prevent phone use or texting during driving, etc.

OBD-2 devices have also been routinely used for usage-based insurance, also known as "pay as you drive" (PAYD) and "pay how you drive" (PHYD) and whereby the costs of motor insurance are dependent upon type of vehicle used, measured against time, distance, behavior and place.

For example, using a small device that connects to an OBD-2 port, ESURANCE DRIVESENSE™ allows policyholders to track a variety of driving habits, from how much time they spend behind the wheel, to unsafe driving habits like speeding and sudden braking. Depending on how safely they drive, DRIVESENSE could save them money on their car insurance.

ESURANCE's teen program, ESURANCE DRIVESAFE combines OBD-2 technology with a smartphone application to help limit phone use while driving. With the data gathered from a teen's car, parents get essential information about their driving in order to better coach them on specific habits.

The telecom provider SPRINT also offers an OBD-2 device that prevents a driver from texting and/or talking during driving. Other company's offer similar devices to track texting and/or talking behaviors.

OBD-2 are also used for vehicle tracking with Global Positioning System (GPS) and other (e.g., cellular telephone, wireless data, etc.) technologies. Such a GPS tracker that installs in the OBD-2 port of a vehicle and communicates the vehicle's location in real-time.

Other devices are also used to assist parents of new drivers. A device can be attached to the vehicle itself. Using dedicated websites or smart phone applications, a maximum speed a car may be driven, geographical zones to be avoided ("geofencing") and any destinations that are specifically forbidden can recorded in real-time. If the car is driven too fast, starts behaving erratically or breaks any of a set pre-defined rules, a driver gets a warning, and a text message or e-mail is sent to the new driver's parents.

There are a number of problems associated with determining driver habits. One problem is that if an OBD-2 device is used, the collection of driver habit data is dependent on using and OBD-2 device to collect the driver habit data. Another problem is that it is difficult to collect driver habit data from multiple ODB-2 devices on multiple vehicles. Another problem, is that driver habits typically depend on a specific make and model of vehicle the driver is driving. For example, a driver who is driving a mini-van will have different driving habits than a driver who is driving a sports car. Another problem is that it is often difficult to determine what a driver telematic signature should actually look like. Another problem is it is difficult to update telematic signatures for drivers.

The have been attempts to solve some of the problems with existing OBD-2 devices. For example, U.S. Pat. No. 5,797,134, that issued to McMillan et al. teaches "A method and system of determining a cost of automobile insurance based upon monitoring, recording and communicating data representative of operator and vehicle driving characteristics. The cost is adjustable retrospectively and can be prospectively set by relating the driving characteristics to predetermined safety standards. The method comprises steps of monitoring a plurality of raw data elements representative of an operating state of the vehicle or an action of the operator. Selected ones of the raw data elements are recorded when the ones are determined to have an identified relationship to safety standards. The selected ones are consolidated for processing against an insurer profile and for identifying a surcharge or discount to be applied to a base cost of automobile insurance. A final cost is produced from the base costs and the surcharges or discounts."

U.S. Pat. No. 6,529,723, that issued to Bentley teaches "The present invention provides an automated user notification system for monitoring user items and notifying a user when selected conditions occur. A first portion of the notification system comprises a network operations center (NOC). The NOC stores user information about one or more user items and is further coupled to a plurality of communication devices that can automatically contact a user. A second portion of the notification system comprises at least one detector. The detector monitors one or more user items and provides information regarding selected conditions of the user items to the NOC via a communication link. When the information is received by the NOC, the NOC automatically matches the received information to information stored at the NOC to determine if a condition exist wherein the user should be automatically notified."

U.S. Pat. No. 6,853,956, that issued to Ballard et al. teaches "A sobriety interlock system having an alcohol detection device electrically connected to a computing device is provided. An electronic circuit is electrically connected between the computing device and an OBD-II port on a machine for receiving data related to operation of the machine. A breath sample is provided by an operator of the machine and the alcohol detection device determines the alcohol concentration of the breath sample. The computing device determines a blood alcohol concentration for the operator based on the breath alcohol concentration, and the computing device prevents or allows operation of the machine based on the level of the blood alcohol concentration. A memory device stores machine operation data received through the OBD-II port."

U.S. Pat. No. 7,113,127, that issued to Banet et al. teaches "Embodiments of the present invention provide a wireless appliance for monitoring a vehicle. The wireless appliance includes a microprocessor configured to select a vehicle-communication protocol of a host vehicle, and then communicate with the host vehicle through the vehicle-communication protocol. The appliance also includes a vehicle-communication circuit, in electrical communication with the microprocessor, which collects diagnostic data from the host vehicle using the vehicle-communication protocol. A GPS module, also in electrical communication with the microprocessor, generates location-based data. For transmitting these data, the appliance includes a first wireless transmitter operating on a terrestrial network and a second wireless transmitter operating on a satellite network. The microprocessor selects the first or second wireless transmitter for transmitting the diagnostic and location-based data."

U.S. Pat. No. 8,558,678, that issued to Van Wiemeersch et al. teaches "Various embodiments may include detecting an unauthorized use of a vehicle in the absence of GPS location information. Vehicle component condition data may be received for one or more vehicle components. Historical vehicle component condition data for the one or more vehicle components may also be received. A comparison between the vehicle component condition data and the historical vehicle component condition data may be performed in order to determine if an inconsistency exists between the vehicle component condition data and the historical vehicle component condition data based on the comparison. Upon determining the inconsistency, an alert signal signifying an unauthorized use may be generated. At least one of the vehicle component condition data and the alert signal may be transmitted to a remote terminal to alert a user of the unauthorized use."

U.S. Pat. No. 8,587,420, that issued to Koen teaches "Data flow from a vehicle telematics device to a remote host, rationalized regardless of the source of the data and its format. Disclosed is a method to unify and process data from multiple sources into singular information for use within the telematics device for vehicle usage data, driver performance, and location data."

U.S. Pat. No. 8,670,897, that issued to Ralson teaches "An in-vehicle mobile communication and routing apparatus for use with a taxi cab, public safety vehicle, delivery truck, fire truck, emergency vehicle, or any vehicle. Embodiments of the invention include a system incorporating the apparatus and a method for using the same. The mobile apparatus is attachable to a vehicle and includes a plurality of long-range transceivers communicatively coupled with one or more databases located remotely from the vehicle, and a plurality of short-range transceivers communicatively coupled with one or more devices external to the mobile apparatus and proximally located to the vehicle. An intelligent power supply is structured to monitor a battery condition of the vehicle and initiate a controlled shutdown of the mobile apparatus responsive to at least one of a timer countdown and a voltage threshold of a vehicle battery. Devices external to the mobile apparatus communicate with an in-vehicle processor and one or more remote databases."

U.S. Pat. No. 8,688,313, that issued to Margol et al. teaches "A system and method for remotely programming a vehicle including a vehicle connector with a plurality of pins in communication with one or more vehicle sub-systems or modules, a vehicle communication device connected to the vehicle connector; a bi-directional communication link between the vehicle communication device and a remote communication device, and a computer system connected to the remote communication device. The vehicle communication device is configured to receive signals from the pins, convert the signals to a network compatible data packet which can then be transmitted to the remote communication device, which re-coverts the signals to the pin signals, which can be read by a computing system, such as a vehicle scan tool. Programming instructions can be sent from the scan tool to the vehicle, over the bi-directional communication link between the remote communication device and the vehicle communication device."

U.S. Pat. No. 8,744,678, that issued to Becher et al. teaches "An apparatus that restricts or disables electronic device functionality based on vehicle status data received from the on-board computer ("OBD") of a public service vehicle. In some embodiments, the vehicle status data is accessed from the OBD through an assembly line diagnostic link ("ALDL") connector, which eliminates any need for modification of the vehicle during installation. If the software determines the vehicle status data is outside a preset range, which could be customized on a case-by-case basis, the on-board computer of the vehicle could be restricted or disabled until the vehicle status data returns to within the preset range."

U.S. Pat. No. 9,418,481, that issued to Phillips teaches "A method and system for automatically creating a unique driver profile for a vehicle from driving habits. A unique driver profile is created with a portable on-board diagnostic series 2 (OBD-2) apparatus and/or linked and/or standalone network device (e.g., smart phone, tablet, wearable device, etc.). The unique driver profile is created from the accepted plural signals including time and geo-location data based on driving habits of the driver. The unique driver profile information is recorded on the apparatus and/or network device, downloaded at a later time or sent in real-time to check and verify an identity of the driver. The unique driver profile helps confirm an identity of the driver of the vehicle based on unique driving habits of the driver."

U.S. Pat. No. 9,988,058, that issued to Phillips teaches "A method and system for automatically creating a unique driver profile for a vehicle from driving habits. A unique driver profile is created with a portable on-board diagnostic series 2 (OBD-2) apparatus and/or linked and/or standalone network device (e.g., smart phone, tablet, wearable device, etc.). The unique driver profile is created from the accepted plural signals including time and geo-location data based on driving habits of the driver. The unique driver profile information is recorded on the apparatus and/or network device, downloaded at a later time or sent in real-time to check and verify an identity of the driver. The unique driver profile helps confirm an identity of the driver of the vehicle based on unique driving habits of the driver."

U.S. Pat. No. 10,065,653, that issued to Phillips teaches "A method and system for automatically creating a unique driver profile for a vehicle from driving habits. A unique driver profile is created with a portable on-board diagnostic series 2 (OBD-2) apparatus and/or linked and/or standalone network device (e.g., smart phone, tablet, wearable device, etc.). The unique driver profile is created from the accepted plural signals including time and geo-location data based on driving habits of the driver. The unique driver profile information is recorded on the apparatus and/or network device, downloaded at a later time or sent in real-time to check and verify an identity of the driver. The unique driver profile helps confirm an identity of the driver of the vehicle based on unique driving habits of the driver."

U.S Published Patent Application No. US2019/0009788A1 published by Phillips discloses "A method and system for automatically creating a unique driver profile for a vehicle from driving habits. A unique driver profile is created with a portable on-board diagnostic series 2 (OBD-2) apparatus and/or linked and/or standalone network device (e.g., smart phone, tablet, wearable device, etc.). The unique driver profile is created from the accepted plural signals including time and geo-location data based on driving habits of the driver. The unique driver profile information is recorded on the apparatus and/or network device, downloaded at a later time or sent in real-time to check and verify an identity of the driver. The unique driver profile helps confirm an identity of the driver of the vehicle based on unique driving habits of the driver. The unique driver profile includes unique behavior patterns of the driver comprising "habit evidence" for legal matters associated with the driver proving with recorded data that the driver of the vehicle acted in a particular way on a particular occasion."

However, none of these solutions solve all of the problems associated with creating driver telematic signatures. Thus, it is desirable to solve some of the problems associated collecting driver habits creating driver telematic signatures.

SUMMARY OF THE INVENTION

In accordance with preferred embodiments of the present invention, some of the problems associated some of the problems associated collecting driver habits creating driver telematic signatures are overcome. A method and system of method and system for creating driver telematic signatures is presented.

The driver telematic signatures include device-independent and vehicle-independent, artificial intelligence (AI) analyzed and dynamic Big Data set (e.g., 100,000–1 Million+data values) calibrated, driver safety scoring system. The driver telematics signatures are created and used in real-time from a cloud Software as a Service (SaaS) on a cloud server network device and a cloud communications network that communicates with a driver's vehicle when it is on and moving. The driver telematics signatures provide current driver performance data, driver habit data and allow determination in real-time of drivers performing risky driver maneuvers. The driver telematics signature are also used to determine a cost of insurance for vehicles.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 9A, 9B and 9C are a flow diagram illustrating a method for automatically creating driver telematic signatures;

FIG. 10 is a flow diagram illustrating a method for automatically creating driver telematic signatures;

DETAILED DESCRIPTION OF PREFERRED EMBODIMENTS

Figure 1:
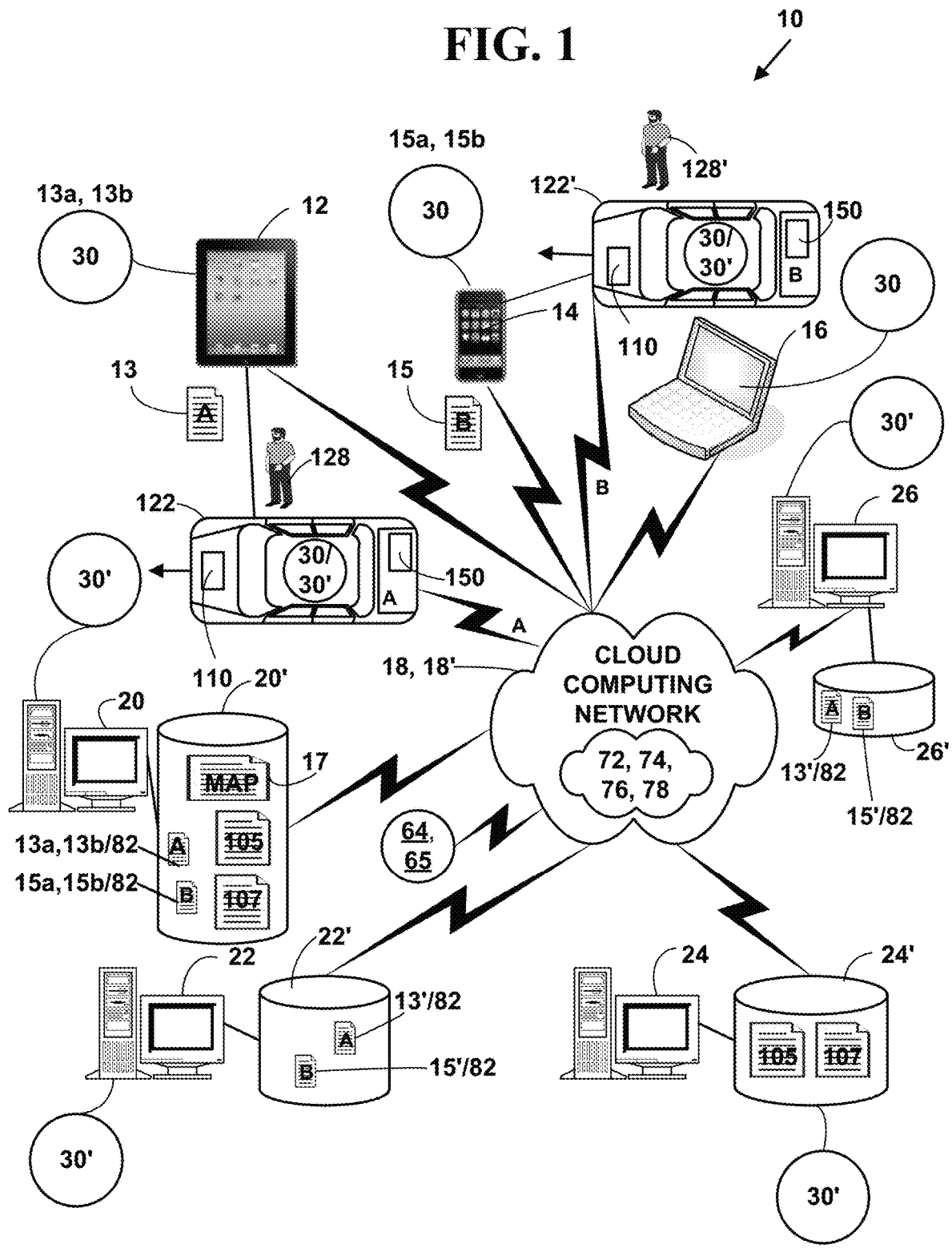
FIG. 1 is a block diagram illustrating an electronic information system.

FIG. 1 is a block diagram illustrating an exemplary driver telematic signature creation system 10. The exemplary electronic system 10 includes, but is not limited to, one or more target network devices 12, 14, 16 (only three of which are illustrated) each with one or more processors and each with a non-transitory computer readable medium.

The one or more target network devices 12, 14, 16 include, but are not limited to, multimedia capable desktop and laptop computers, tablet computers, mobile phones, non-mobile phones, smart phones, Internet phones, Internet appliances, personal digital/data assistants (PDA), wearable devices, portable game consoles (Play Station Portable by SONY, Game Boy by SONY, NINTENDO DSI, etc.), non-portable game consoles (Xbox by MICROSOFT, Play Station by SONY, Wii by NINTENDO, etc.), cable television (CATV), satellite television (SATV) and Internet television set-top boxes, digital televisions including high definition television (HDTV), three-dimensional (3DTV) televisions and other types of network devices.

The one or more, smart network devices 14 include smart phones such as the iPHONE by APPLE, Inc., ANDROID by MOTOROLA, Inc. HTC, Inc., SAMSUNG, Inc., and/or other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The one or more smart network devices 12 include tablet computers such as the iPad, by Apple, Inc., the HP Tablet, by Hewlett Packard, Inc., the Playbook, by RIM, Inc., the Tablet, by Sony, Inc.

The target network devices 12, 14, 16, 98-106 are in communications with a cloud communications network 18 and/or non-cloud communications network 18' via one or more wired and/or wireless communications interfaces. The cloud communications network 18, is also called a "cloud computing network" herein and the terms may be used interchangeably.

The plural target network devices 12, 14, 16, 98-106 received desired electronic content 13, 15 (e.g., driver telematic signatures 13a, 13b, 15a, etc.) stored on the cloud communications network 18.

The cloud communications network 18 includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 98-106 via the cloud communications network 18.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, etc.) securely stores a cloud content location map 17 and other plural server network devices (e.g., 22, 24, 26, etc.) store portions 13', 15' of desired electronic content 13, 15 as cloud storage objects 82 (FIG. 5) as is described herein.

The plural server network devices 20, 22, 24 26, include, but are not limited to, World Wide Web servers, Internet servers, search engine servers, driver telematic signature servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
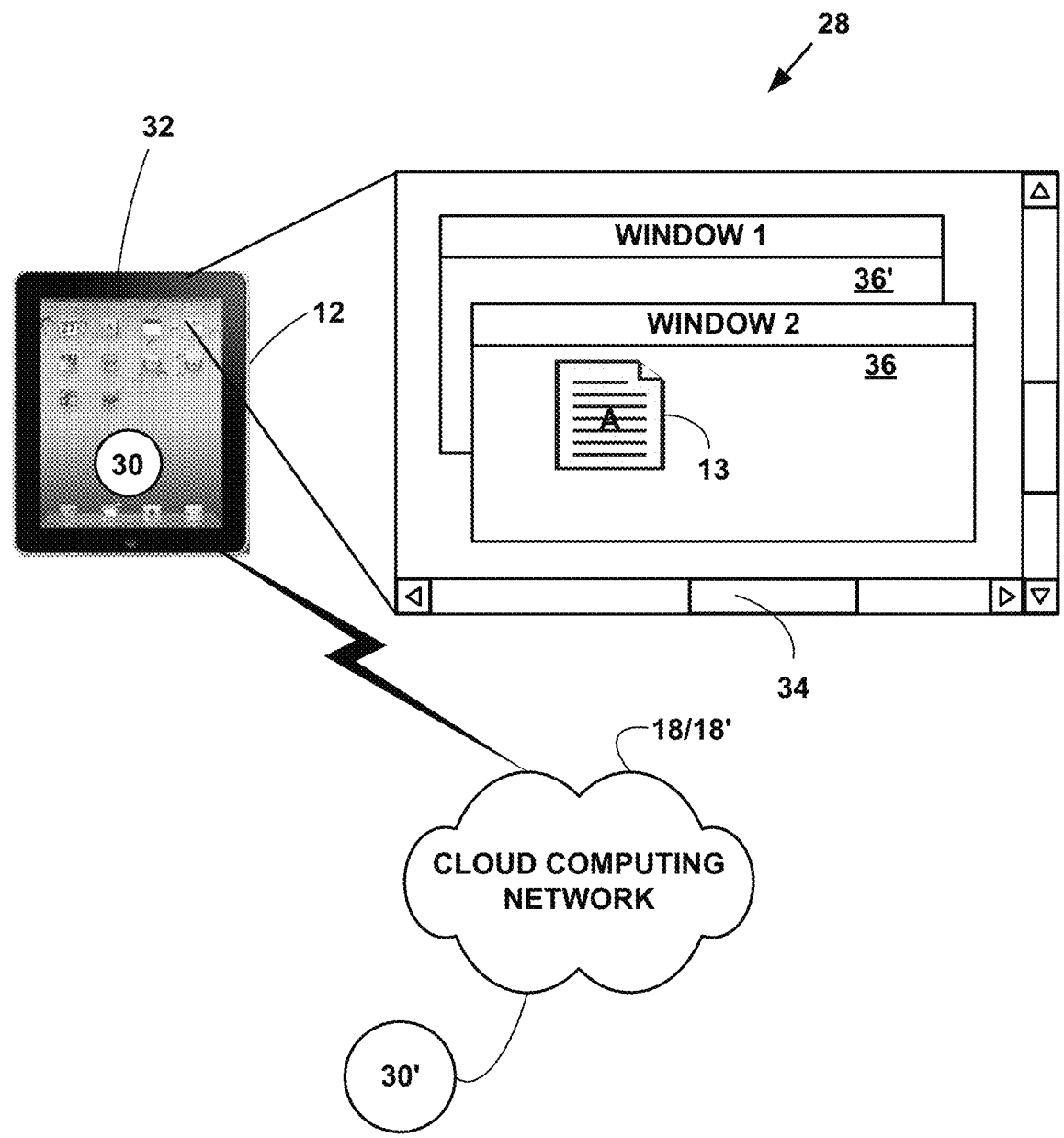
FIG. 2 is a block diagram illustrating an exemplary electronic content information display system.

FIG. 2 is a block diagram illustrating an exemplary driver telematic signature display system 28. The display system 28 includes, but is not limited to a target network device (e.g., 12, etc.) with a cloud application 30 and a display component 32. The cloud application 30 presents a graphical user interface (GUI) 34 on the display 32 component. The GUI 32 presents a multi-window 36, 36', etc. (only two of which are illustrated) interface to a user.

In one embodiment of the invention, the cloud application 30 is a software application. However, the present invention is not limited to this embodiment and the cloud application 30 can be hardware, firmware, hardware and/or any combination thereof. However, the present invention is not limited these embodiments and other embodiments can be used to practice the invention.

In another embodiment, a portion of the cloud application 30 is executing on the target network devices 12, 14, 16. 98-106 and another portion of the application 30' is executing on the server network devices 20, 22, 24, 26. However, the present invention is not limited these embodiments and other embodiments can be used to practice the invention. In one embodiment, the application 30 includes a driver telematic signature creation application and application 30' a driver telematic signature creation application executing as a cloud service (e.g., SaaS 64, etc.). In another embodiment, application 30/30' is a non-cloud application. However, the present invention is not limited these embodiments and other embodiments can be used to practice the invention.

In one embodiment, the application 30/30' includes an application programming interface (API). An application programming interface (API) specifies how some software components interact with each other. In addition to accessing databases or computer hardware, such as hard disk drives or video cards, an API is used to ease the work of programming GUI components, to allow integration of new features into existing applications (a so-called "plug-in API"), or to share data between otherwise distinct applications. An API includes a library that includes specifications for routines, data structures, object classes, and variables. In some other cases, notably for REpresentational State Transfer (REST) and Simple Object Access Protocol (SOAP) services, an API comes as a specification of remote calls exposed to the API consumers. However, the present invention is not limited these embodiments and other embodiments can be used to practice the invention, with and/or without an API.

Exemplary Networking Protocol Stack

Figure 3:
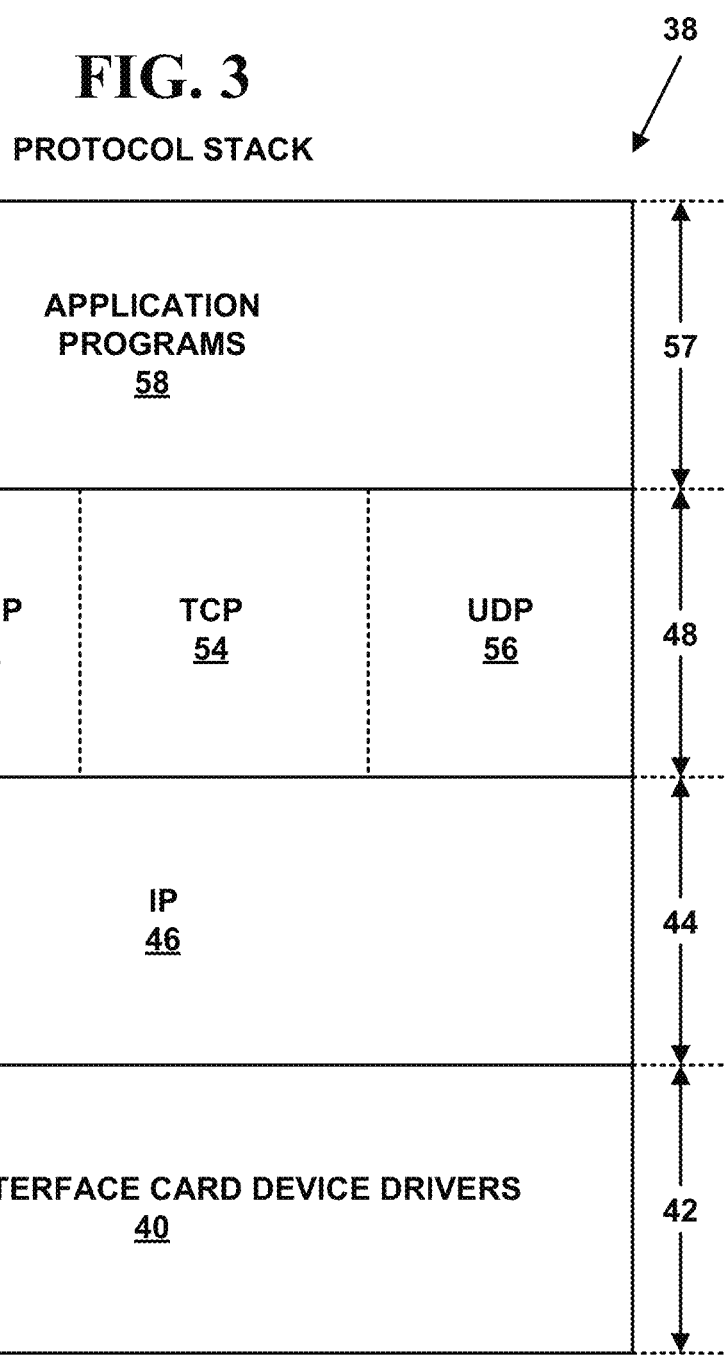
FIG. 3 a block diagram illustrating a layered protocol stack for network devices in the electronic information display system.

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 57 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer).

The network devices 12, 14, 16, 98-106, 20, 22, 24, 26 are connected to the communication network 18 with Network Interface Card (NIC) cards including device drivers 40 in a link layer 42 for the actual hardware connecting the network devices 12, 14, 16, 98-106, 20, 22, 24, 26 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 54 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52, is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30', etc.) to carry out desired functionality for a network device reside. For example, the application programs 54 for the client network devices 12, 14, 16, 98-106 may include a web-browsers or other application programs, cloud application program 30, while application programs for the server network devices 20, 22, 24, 26 may include other application programs (e.g., 30', etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Exemplary Wireless Interfaces

In one embodiment of the present invention, the wireless interfaces on network devices 12, 14, 16, 98-106, 20, 22, 24, 26 include but are not limited to, IEEE 802.11a, 802.11b, 802.11g, 802.11n, 802.15.4 (ZigBee), "Wireless Fidelity" (Wi-Fi), Wi-Fi Aware, "Worldwide Interoperability for Microwave Access" (WiMAX), ETSI High Performance Radio Metropolitan Area Network (HIPERMAN), "RF Home," Near Field Communications (NFC) and/or Machine-to-Machine (M2M) wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

Wi-Fi Aware is a new capability for energy-efficient, proximity-based service discovery among Wi-Fi capable devices. The technology in Wi-Fi Aware enables network devices to discover other devices, applications, and information nearby before making a Wi-Fi connection. Wi-Fi Aware makes contextual awareness more immediate and useful, enabling personalized applications (e.g., 30, 30', etc.) that continuously scan surroundings, anticipate actions, and notify of services and selected preferences. Wi-Fi Aware devices go through a process of discovery and synchronization, establishing a common "heartbeat" that enables very power efficient operation. Devices form clusters and exchange small messages about services available nearby, enabling immediate discovery. Wi-Fi Aware's ability to send and receive tiny messages before establishing a network 18, 18' connection further enables a two-way conversation among network devices in emergency and non-emergency situations whose current physical geographic locations and/or 2D/3D geo-space (X,Y) and/or (X,Y,Z) information may be known and available. This capability not only enables a network device to discover nearby information and services, but request additional information, such as emergency location information—all without establishing, an Internet, PSTN, or other network connections 18, 18'. The Wi-Fi Aware reference document, wp_Wi-Fi_Aware_Industry_20150714_v2, Jul. 14, 2015, is incorporated herein by reference.

In one embodiment, the applications 30, 30' include Wi-Fi Aware capabilities. In one embodiment the wireless interfaces include Wi-Fi Aware wireless interface capabilities. However, the present invention is not limited to these embodiments and the invention can be practiced without Wi-Fi Aware capabilities.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps, two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the domain name "www.ieee802.org" and "www.zigbee.org" respectively.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the domain name "www.wimax-forum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the domain name "www.etsi.org." ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without a buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18.

The one or more target network devices 12, 14, 16, 98-106 and one or more server network devices 20, 22, 24, 26 also communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) 99 tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

Short Message Service (SMS) is a text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies, such as ANSI CDMA networks and Digital AMPS as well as satellite and landline networks.

However, the present invention is not limited to such wireless interfaces and wireless networks and more, fewer and/or other wireless interfaces can be used to practice the invention.

Exemplary Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV, the Internet 76, other networks 72, 74, 78, etc. that connect the network devices 12, 14, 16, 98-106, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Security and Encryption

Network devices 12, 14, 16, 98-106, 20, 22, 24, 26 with wired and/or wireless interfaces of the present invention include one or more of the security and encryptions techniques discussed herein for secure communications on the cloud communications network 18.

Application programs 58 (FIG. 2) include security and/or encryption application programs integral to and/or separate from the cloud applications 30, 30' Security and/or encryption programs may also exist in hardware components on the network devices (12, 14, 16, 98-106, 20, 22, 24, 26) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the domain name "www.nist.gov/aes."

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
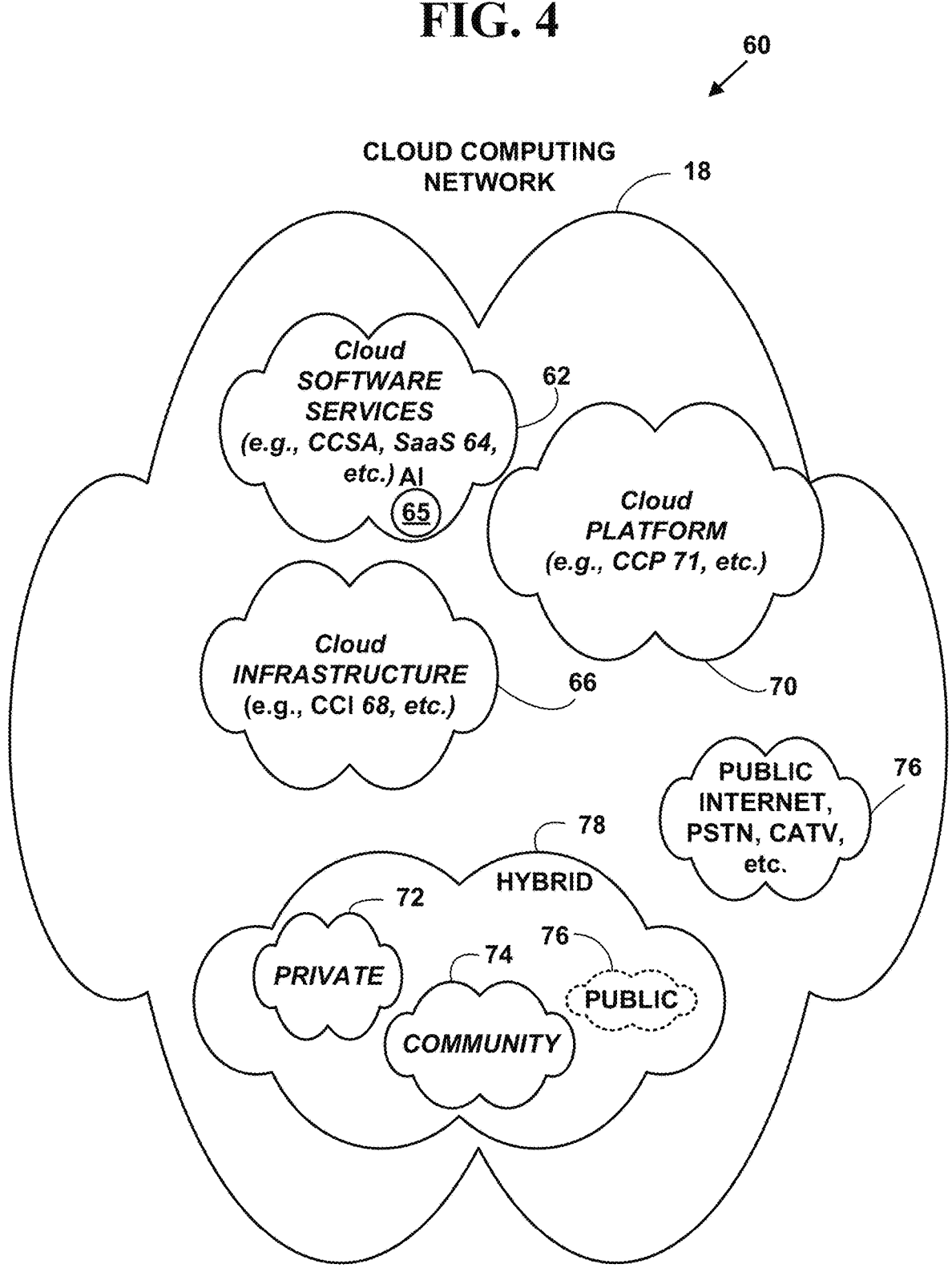
FIG. 4 is a block diagram illustrating an exemplary cloud computing network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

On-demand Driver Telematic Signature Creation Services. Driver Telematic Signature Creation Services can unilaterally provision computing capabilities, such as server time and network storage, as needed automatically without requiring human interaction with each network server on the cloud communications network 18.
Broadband network access. Driver Telematic Signature Creation service capabilities are available over plural broadband communications networks and accessed through standard mechanisms that promote use by heterogeneous thin or thick client platforms (e.g., mobile phones, smart phones 14, tablet computers 12, laptops 16, PDAs, etc.). The broadband network access includes high speed network access wireless and/or wired and broadband and/or ultra-broad band (e.g., WiMAX, etc.) network access.
Resource pooling. Driver Telematic Signature Creation Service resources are pooled to serve multiple requesters using a multi-tenant model, with different physical and virtual resources dynamically assigned and reassigned according to Driver Telematic Signature Creation service demand. There is location independence in that a requester of electronic content has no control and/or knowledge over the exact location of the provided by the Driver Telematic Signature Creation Service resources but may be able to specify location at a higher level of abstraction (e.g., country, state, or data center). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale for the Driver Telematic Signature Creation Services. To the electronic content storage and retrievers, the Driver Telematic Signature Creation capabilities available for provisioning appear to be unlimited and can be used in any quantity at any time.
Measured Services. Cloud computing systems automatically control and optimize resource use by leveraging a metering capability at some level of abstraction appropriate to the type of Driver Telematic Signature Creation Service (e.g., storage, processing, bandwidth, custom driver Telematic Signature Creation Service applications, etc.). Driver Telematic Signature Creation Service usage is monitored, controlled, and reported providing transparency for both the electronic content provider and the electronic content requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

Cloud Computing Software Applications 62 fora Driver Telematic Signature Creation Service (CCSA, SaaS 64). The capability to use the provider's applications 30, 30' running on a cloud infrastructure 66. The cloud computing applications 62, are accessible from the server network device 20 from various client devices 12, 14, 16, 98-106 through a thin client interface such as a web browser, etc. The user does not manage or control the underlying cloud infrastructure 66 including network, servers, operating systems, storage, or even individual application 30, 30' capabilities, with the possible exception of limited user-specific application configuration settings.
Cloud Computing Infrastructure 66 for a Driver Telematic Signature Creation Service (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30'. The user does not manage or control the underlying cloud infrastructure 66 but has control over operating systems, storage, deployed applications, and possibly limited control of select networking components (e.g., host firewalls, etc.).
Cloud Computing Platform 70 for a Driver Telematic Signature Creation Service (CCP 71). The capability provided to the user to deploy onto the cloud infrastructure 66 created or acquired applications created using programming languages and tools supported servers 20, 22, 24, 26, etc.. The user not manage or control the underlying cloud infrastructure 66 including network, servers, operating systems, or storage, but has control over the deployed applications 30, 30' and possibly application hosting environment configurations.

Exemplary cloud computing deployment models appear in Table 3. However, the present invention is not limited to these deployment models and more, fewer or other deployment models can also be used to practice the invention.

TABLE 3

Private cloud network 72. The cloud network infrastructure is operated solely for a Driver Telematic Signature Creation Services. It may be managed by the Driver Telematic Signature Creation Service provider or a third party and may exist on premise or off premise.
Community cloud network 74. The cloud network infrastructure is shared by several different organizations and supports a specific driver telematic signature creation community that has shared concerns (e.g., mission, security requirements, policy, compliance considerations, etc.). It may be managed by the different organizations or a third party and may exist on premise or off premise.
Public cloud network 76. The cloud network infrastructure such as the Internet, PSTN, SATV, CATV, Internet TV, etc. is made available to the general public or a large industry group and is owned by one or more organizations selling cloud services.
Hybrid cloud network 78. The cloud network infrastructure 66 is a composition of two and/or more cloud networks 18 (e.g., private 72, community 74, and/or public 76, etc.) and/or two or more other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for driver Telematic signature creation services takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30', offers cloud services for Driver Telematic Signature Creation. The application 30, 30' offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 62 (SaaS) including a specific cloud software service 64 for Driver Telematic Signature Creation Services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
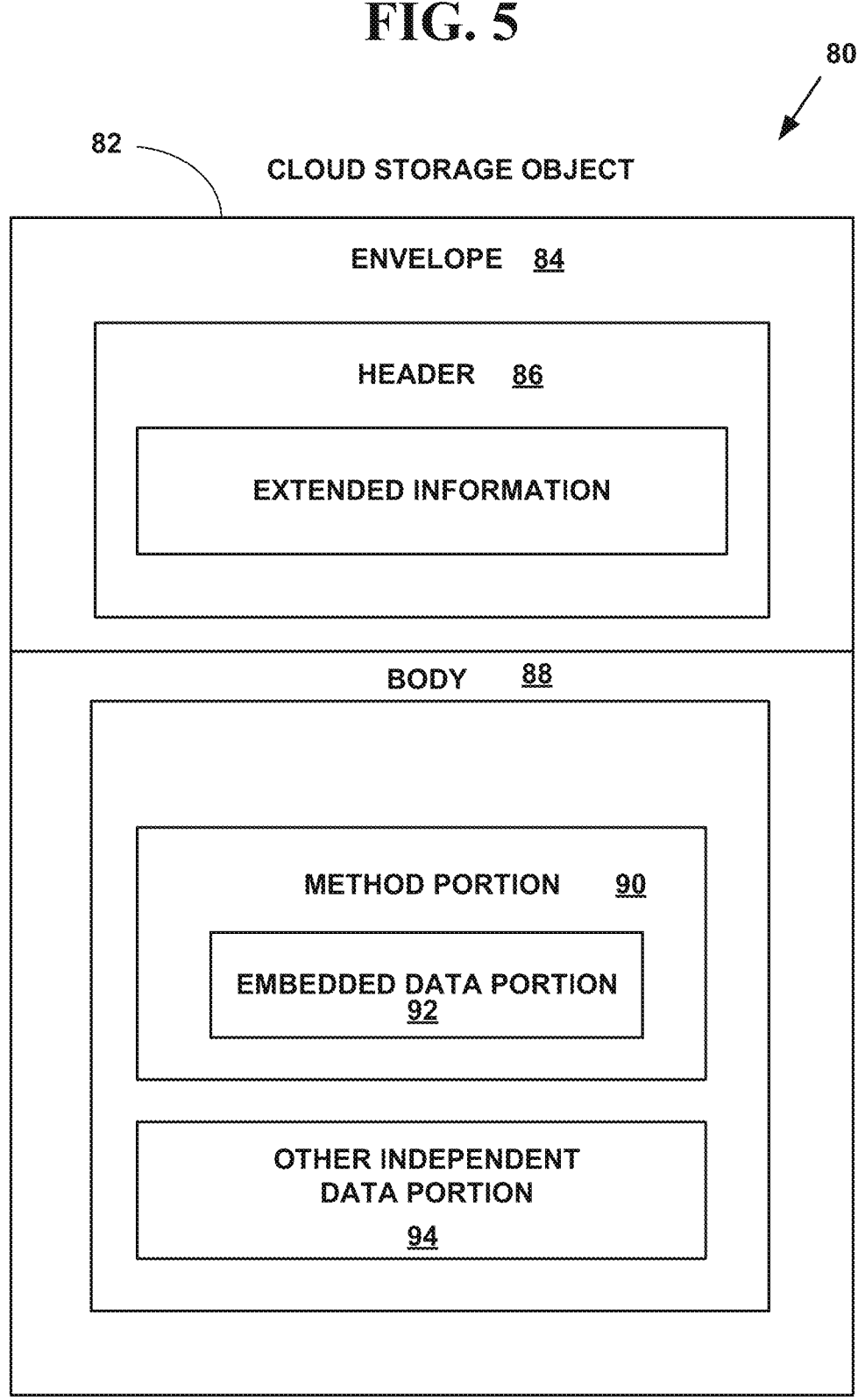
FIG. 5 is a block diagram illustrating an exemplary cloud storage object.

FIG. 5 is a block diagram 80 illustrating an exemplary cloud storage object 82.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions 13', 15' of desired electronic content across such networks 72, 74, 76, 78 of the cloud communications network 18. Cloud storage objects 82 includes one or more portions 13', 15' of desired electronic content and can be stored on any of the 72, 74, 76, 78 networks of the cloud communications network 18. Cloud storage objects 82 are transparent to a requester of desired electronic content and are managed by cloud applications 30, 30'.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Wearable Devices

Figure 6:
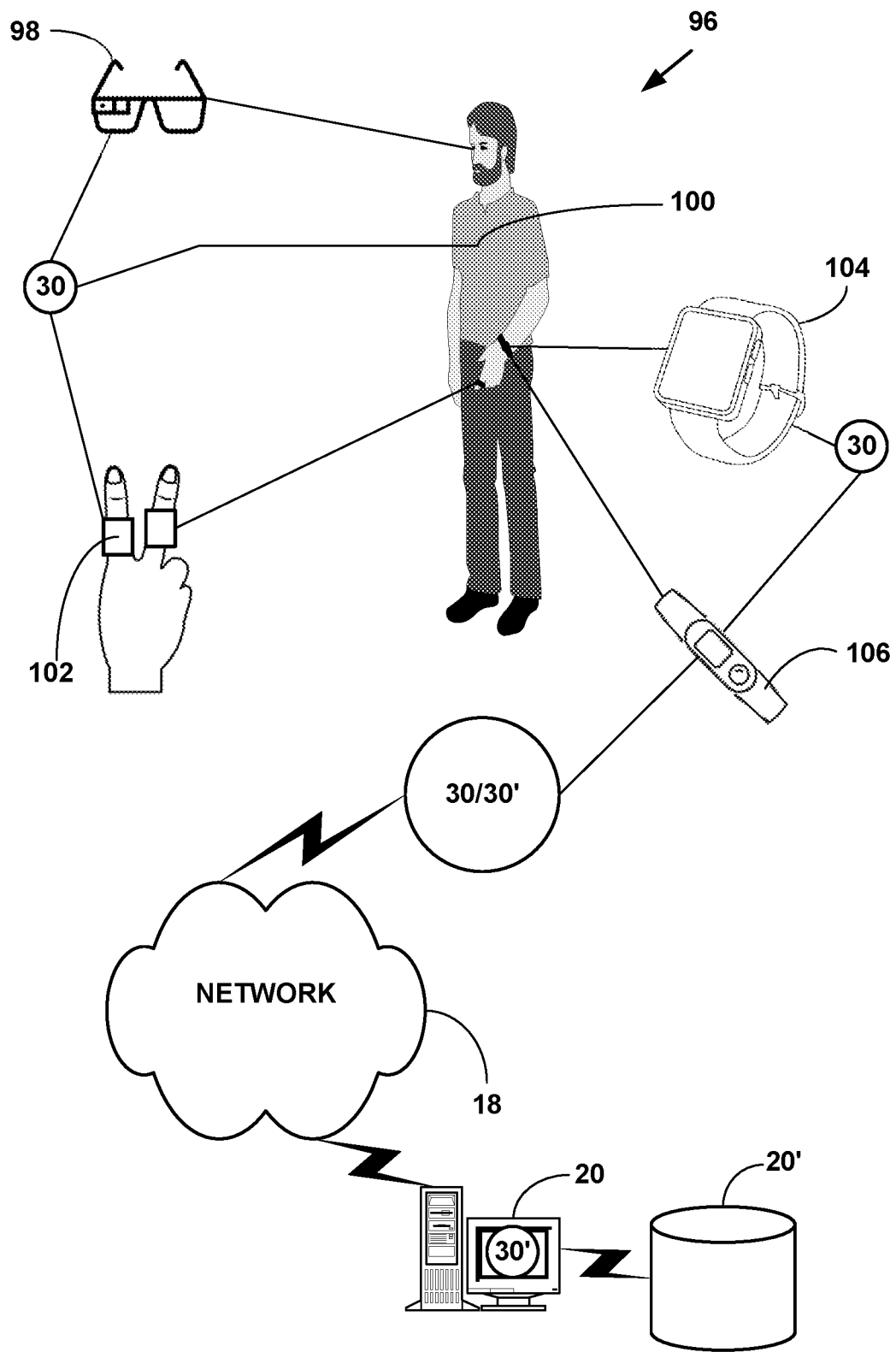
FIG. 6 is a block diagram illustrating an exemplary wearable network devices.

FIG. 6 is a block diagram 96 illustrating exemplary wearable network devices 98-106.

Wearable mobile technology" and/or "wearable devices" are clothing and accessories incorporating computer and advanced electronic technologies. Wearable mobile network devices provide several advantages including, but not limited to: (1) Quicker access to notifications. Important and/or summary notifications are sent to alert a user to view a whole new message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices also take Telematic data recordings and providing useful feedback for users for exercise, health, fitness, etc. activities.

Digital eyewear, such as GOOGLE Glass, Smart watches by SONY, NIKE, GARMIN, SAMSUNG, wrist bands and/or fitness bands by LG, NIKE, FITBIT, etc. and others are examples of wearable mobile devices. Just like mobile and non-mobiles phones, a current physical location of such wearable mobile devices must be determine in an emergency situation.

In one embodiment, the target network devices include wearable network devices 98-106. The wearable devices include one or more processors and include, but are not limited to, wearable digital glasses 98 (e.g., GOOGLE Glass, etc.), clothing 100 (e.g., smart ties, smart headwear, smart jackets and/or pants, smart shoes, etc.), jewelry 102 (e.g., smart rings, smart earrings, etc.), smart watches 104 (e.g., SONY, NIKE, SAMSUNG, NIKE, GARMIN, etc.) and/or wrist bands and/or fitness bands 106 (e.g. GARMIN, FITBIT, POLAR, NIKE, JAWBONE, LG, etc.). The wearable mobile devices 98-106 includes cloud application 30 and/or 30'. All of the wearable devices 98-106 have one or more processors and/or selected ones have other components including, but not limited to, accelerometers, altimeters, cameras, GPS, music control, phone compatibility, etc. The for automatic vehicle identification number verification methods described herein are executed from the wearable devices 98-106. However, the present invention is not limited to such embodiments and more, fewer and other types of wearable devices can also be used to practice the invention.

On-Board Diagnostics (OBD)

On-board diagnostics (OBD) is an automotive term referring to a vehicle's self-diagnostic and reporting capability. OBD systems give the vehicle owner or repair technician access to the status of the various vehicle subsystems. The amount of diagnostic information available via OBD has varied widely since its introduction in the early 1980s versions of on-board vehicle computers. Early versions of OBD would simply illuminate a malfunction indicator light if a problem was detected but would not provide any information as to the nature of the problem. Modern OBD implementations use a standardized digital communications port to provide real-time data in addition to a standardized series of diagnostic trouble codes, or DTCs, which allow one to rapidly identify and remedy malfunctions within the vehicle.

OBD-2 is an improvement over OBD in both capability and standardization. The OBD-2 standard specifies the type of diagnostic connector and its pinout, the electrical signaling protocols available, and the messaging format. It also provides a candidate list of vehicle parameters to monitor along with how to encode the data for each.

Figure 7:
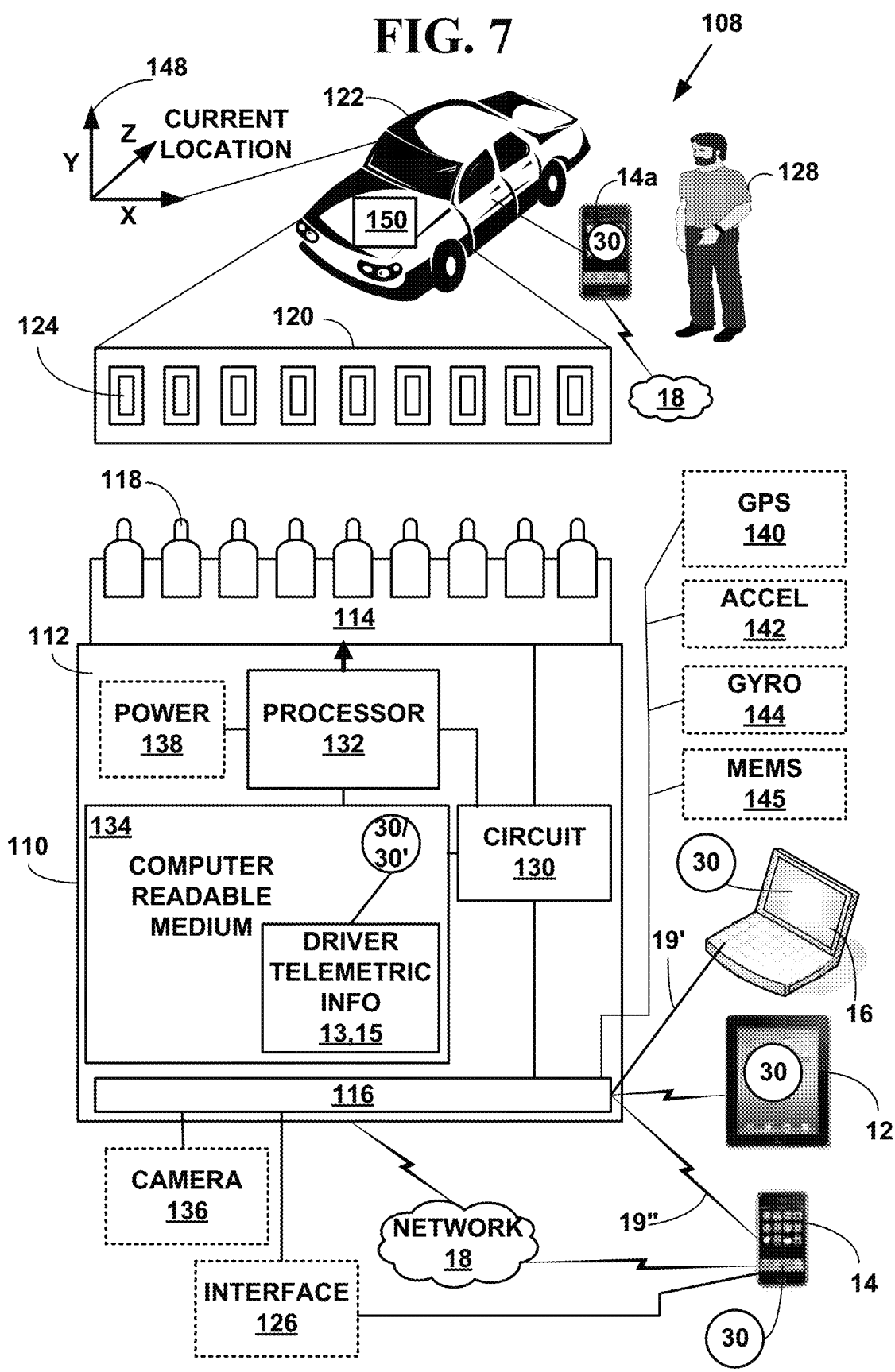
FIG. 7 is a block diagram illustrating a portable vehicle on-board diagnostics-2 (OBD-2) apparatus.

FIG. 7 is a block diagram 108 illustrating a portable vehicle on-board diagnostics-2 (OBD-2) apparatus 110.

Figure 8:
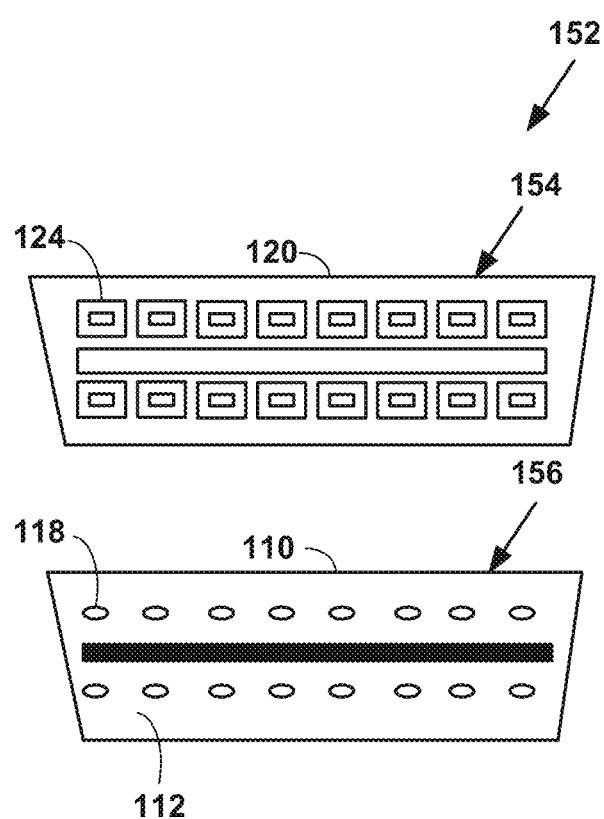
FIG. 8 is a block diagram illustrating a side view of the portable vehicle on-board diagnostics (OBD-2) apparatus of FIG. 7.

FIG. 8 is a block diagram 142 illustrating another view of the portable vehicle on-board diagnostics (OBD-2) apparatus 110 of FIG. 7. FIG. 8 is not drawn to scale and is illustrative only of a one exemplary shape of an OBD-2 apparatus 110.

Return to FIG. 7, the OBD-2 apparatus 110 comprises a case component 112, including a first side comprising a male connector 114 and a second side of the case component including a second connector 116 for connecting to the cloud network 18. The male connector 114 includes plural pins 118 extending from the male connector 114 for connecting to a female on-board diagnostic series 2 (OBD-2) port 120 integral to a vehicle 122 with plural female electronic receptacles 124 for receiving the plural male pins 118 from the male connector 114. The shape and size of the plural pin male connectors 118 in the drawing in FIG. 6 is exemplary only and for simplicity and does not illustrate all sixteen pins required for an actual OBD-2 connector. The female OBD-2 port 120 also does not include all sixteen receptacles 124 required for an OBD-2 receptacle for simplicity.

The second connector 116 includes a second type of interface 126 for securely providing driver Telematic signature information for a driver 128 the vehicle 122 to an external network device 12, 14, 16, 98-106, 20, 22, 24, each with one or more processors. The apparatus OBD-2 110 further includes an electronic circuit 130 including one or more processors 132 inside the case component 112 connected to the male connector 114, the second connector 116 and a non-transitory computer readable medium 134. The electronic circuit 130 is configured for automatically storing and transmitting driver Telematic signature information 13, 15 received from the plural electronic signals from the vehicle 122 or a component of a network device 12, 14, 16 as received as a result of a driver 128 driving the vehicle 122. The driver Telematic signature information 13, 15 is stored in the non-transitory computer readable medium 134. The non-transitory computer readable medium 134 includes driver Telematic signature creation application 30.

In one embodiment, the OBD-2 apparatus 110 further includes a camera interface 136 in communications with the second interface 126 and electronic circuit 130 for collecting still pictures of: (1) the driver 128 of the vehicle 122; (2) the vehicle 122; (3) video of the driver 129 of the vehicle 122 and/or (4) video of the vehicle 122 as the vehicle 122 is operated by the driver 28. In another embodiment, a camera component of an external network device 12, 14, 16, 98-106 is used to collect still pictures and/or video of the driver 128 and/or the vehicle 122 as it is driven. The external network device 12, 14, 16, 98-106 communicate with the OBD-2 apparatus 110 via the second interface 126 via driver telematic signature creation apparatus 30 with a wireless 19" or wired 19' connection to send the still pictures and/or video for storage on the OBD-2 apparatus 110. However, the present invention is not limited to such an embodiment and the present invention can be practiced with and/or without the camera interface 136.

In one embodiment, the electronic circuit 130 of the OBD-2 apparatus 110 is powered by a power source from the vehicle 122 (e.g., 12 volt, etc.) The power source is obtained from one of the plural receptacles 124 (e.g., pin 16, etc.) in the OBD-2 diagnostic port 120 integral to the vehicle 122.

In another embodiment, the electronic circuit 130 of the OBD-2 apparatus 110 receives a first power source from the vehicle 122. When the OBD-2 apparatus 110 is unplugged from the OBD-2 diagnostic port 120 integral to the vehicle 122, it has no power. To retrieve the driver telematic signature information 13, 15, the OBD-2 apparatus 110 uses a second power source supplied to the second connector 116 from an external device 12, 14, 16, 98-106, 20, 22, 24, etc. via the wired 19' or wireless 19" connection.

However, the present invention is not limited to such embodiments and more, fewer and other combinations of internal and/or external power sources can be used to practice the invention.

In another embodiment the electronic circuit 130 of the OBD-2 apparatus 110 is powered by a power source of the second connector 116 (e.g., serial, USB, wireless, etc.).

In another embodiment, the electronic circuit 130 further includes an internal power supply 138 comprising a Direct Current (DC) and/or an Alternating Current (AC) power supply and/or a combination thereof.

The power supply 138 includes an electronic device that supplies electric power to an electrical load. The primary function of a power supply is to convert one form of electrical energy to another and, as a result, power supplies are sometimes referred to as electric power converters. Some power supplies are discrete, stand-alone devices, whereas others are built into larger devices along with their loads. Every power supply must obtain the energy it supplies to its load, as well as any energy it consumes while performing that task, from an energy source. All power supplies have a power input, which connects to the energy source, and a power output that connects to the load. In many power supplies the power input and output consist of electrical connectors.

In one embodiment, the power supply 138 includes a DC power supply. A DC power supply is one that supplies a voltage of fixed polarity (either positive or negative) to its load. Depending on its design, a DC power supply may be powered from a DC source or from an AC source. DC power supplies, include, but are not limited to, batteries, thermocouples, solar cells, capacitors, etc.

A "battery" is a device consisting of one or more electrochemical cells that convert stored chemical energy into electrical energy. In one embodiment, the apparatus 136, includes a battery with life of about two-four weeks to allow for downloading from the apparatus 136. In one embodiment, a primary and a backup battery is used. However, the present invention is not limited to this embodiment and the invention can be practiced without a backup battery.

A "thermocouple" is a temperature-measuring device consisting of two dissimilar conductors that contact each other at one or more spots. It produces a voltage when the temperature of one of the spots differs from the reference temperature at other parts of the circuit.

A "solar cell" (also called a photovoltaic cell) is an electrical device that converts the energy of light directly into electricity by the photovoltaic effect.

A "capacitor" (originally known as a condenser) is a passive two-terminal electrical component used to store energy electrostatically in an electric field. For example, the mechanical motion of the solenoid valve 24, other valves and/or pumps is used to dispense the condiment can be used re-charge the capacitor.

In another embodiment, the power supply 138 includes an AC power supply.

An AC power supply typically takes the voltage from a main power source, (e.g., 110 volt wall socket, etc.) and lowers it to a desired voltage.

In another embodiment, the power supply 138 includes a switched-mode power supply (SMPS). In an SMPS, the AC mains input is directly rectified and then filtered to obtain a desired DC voltage. The resulting DC voltage is then switched on and off at a high frequency by electronic switching circuitry, thus producing an AC current that will pass through a high-frequency transformer or inductor. Switching occurs at a very high frequency (e.g., typically 10 kHz to 1 MHz), thereby enabling the use of transformers and filter capacitors that are much smaller, lighter, and less expensive than those found in linear power supplies operating at mains frequency. After the inductor or transformer secondary, the high frequency AC is rectified and filtered to produce the desired DC output voltage. In such an embodiment the power is obtained for the SMPS from power source on the vehicle 104.

However, the present invention is not limited to the power supplies discussed and other types of internal and/or external power supplies and/or other combinations of AC and DC power can be used to practice the invention.

The OBD-2 device 110 also includes a Global Positioning System (GPS) component 140, an accelerometer component 142 and/or a gyroscope component 144. However, the present invention is not limited to such an embodiment and more, fewer and/or other types of location and motion related components can be used to practice the invention.

The Global Positioning System (GPS) is a space-based global navigation satellite system (GNSS) that provides reliable location and time information in all weather and at all times and anywhere on or near the Earth. A GPS component 140 receiver calculates its position by precisely timing signals sent by GPS satellites. The GPS receiver 140 uses the messages it receives to determine a transit time of each message and computes a distance to each GPS satellite. These distances along with the satellites' locations are used with the possible aid of triangulation, depending on which algorithm is used, to compute a current physical position 148 of the vehicle 122. Many GPS units also show derived information such as travel direction and speed, calculated from position changes. The GPS coordinates include standard GPS, GPS map, Digital GPS (DGPS) and/or other types of GPS information.

In one embodiment, the GPS coordinates include longitude and latitude. However, the present invention is not limited to such an embodiment and other embodiments can be used to practice the invention.

In another embodiment, the GPS coordinates include, two-dimensional geo-space (X,Y) information, three-dimensional (X,Y,Z) geo-space information, two or more street names, or latitude and longitude coordinates with and/or without elevation information. However, the present invention is not limited to such an embodiment and other embodiments can be used to practice the invention.

An "accelerometer" 142 is a device designed to measure non-gravitational acceleration. When the object it's integrated into goes from a standstill to any velocity, the accelerometer is designed to respond to the vibrations associated with such movement. It uses microscopic crystals that go under stress when vibrations occur, and from that stress a voltage is generated to create a reading on any acceleration. Target network devices 12, 14, 16, 98-106 typically include an accelerometer 142 as a default component.

A "gyroscope" 144 is a device that uses Earth's gravity to help determine orientation. Its design typically includes a freely-rotating disk called a rotor, mounted onto a spinning axis in the center of a larger and more stable wheel. As the axis turns, the rotor remains stationary to indicate the central gravitational pull, and thus which way is "down." Target network devices 12, 14, 16, 98-106 may also include a gyroscope component 144.

The main difference between the two devices is simple: one can sense rotation, whereas the other cannot. An accelerometer 142 can gauge the orientation of a stationary item such as the vehicle 122 with relation to Earth's surface. However, when accelerating in a particular direction, the accelerometer is unable to distinguish between that and the acceleration provided through Earth's gravitational pull.

The gyroscope 144 maintains its level of effectiveness by being able to measure the rate of rotation around a particular axis. When gauging the rate of rotation around the roll axis of a vehicle 122, it identifies an actual value until the object stabilizes out. Using the key principles of angular momentum, the gyroscope helps indicate orientation. In comparison, the accelerometer measures linear acceleration based on vibration.

The typical two-axis accelerometer 142 gives users a direction of gravity in a vehicle 122, target network device 12, 14, 16, 98-106, and/or other network device. In comparison, a gyroscope 144 is intended to determine an angular position based on the principle of rigidity of space of the vehicle 12.

Micro-Electro-Mechanical-Systems (MEMS), is a technology of micro devices, particularly those with moving mechanical parts. MEMS components in the vehicle 122 typically include, but are not limited to, airbag systems, suspension systems, vehicle transmission control systems, engine management control systems, rollover detection systems, vehicle seat comfort systems, vehicle navigation systems, electronic parking brake systems, and/or antitheft systems. MEMS components in a vehicle 122 may also include GPS componets 140, the acceleration components 142 and/or the gyroscope component 144. The driver telematic information 13, 15 collected on the vehicle 122 includes MEMS information 145.

In another embodiment, components 116, 126, 130-140 from the ODB-2 110 are placed into a stand-alone telematic network device 150, which is placed within and/or attached within and/or attached directly to the vehicle 122 (e.g., underneath the vehicle 122, in an engine compartment of the vehicle 122, in a trunk of the vehicle 122, etc.) and/or included in a standalone network device 14, (FIG. 1), 14a (FIG. 7) placed within the vehicle 122. However, the present invention is not limited to this embodiment.

FIG. 8 illustrates a side view of OBD-2 apparatus 110. FIG. 8 illustrates further details 152 of the female on-board diagnostic series 2 (OBD-2) port 120 integral to a vehicle 122 with all 16 electronic receptacles 124. FIG. 8 also illustrates further details 154 of the male connector 114 including all 16 pins 118 of the OBD-2 apparatus 110 of FIG. 7.

Table 4 illustrates a few standard female pin receptacles 124 defined for OBD-2. However, the present invention is not limited to this pin receptacle layout and other receptacle layouts and signals can be used to practice the invention.

TABLE 4

| Pin Receptacle 124 | Signal | Description |
|---|---|---|
| 2 | J1850 Bus+ | |
| 4 | CGND | GND |
| 5 | SGND | GND |
| 6 | CAN High | J-2284 |
| 7 | ISO 9141-2 K-LINE | Tx/Rx |
| 8 | GPS | GPS |
| 10 | J1850 Bus- | |
| 14 | CAN Low | J-2284 |
| 15 | ISO 9141-2 L-LINE | Tx/Rx |
| 16 | +12v | Battery power |

A Controller Area Network (CAN) bus is used in most cars since 2004. The CAN protocol is a popular standard outside of the automotive industry and is making significant in-roads into the OBD-2 market share. By 2008, all vehicles sold in the US were required to implement the CAN bus, thus eliminating the ambiguity of the existing five signaling protocols.

The CAN bus is simply a pair of wires, often twisted around each other, running around the vehicle and terminated at either end of the two-wire network with resistors of 120 Ohms. The only components connected to the CAN bus are the electronic control units (nodes). Other components, such as sensors, motors, light bulbs, switches, etc. are wired only to the electronic control units. Some vehicles have a CAN bus system alongside the ISO/KWP2000 system. A vehicle which uses CAN bus for on-board diagnostics can only respond to an OBD-2 request from a tester which uses CAN bus. From model year 2008 vehicle manufacturers must use the OBD protocol specified in ISO 15765, also known as Diagnostics On CAN (DOCAN).

Two wires of CAN bus, CAN-H and CAN-L, will have the same voltage when idle (about 2.5V), or a voltage difference of 2V when a signal is placed on the CAN bus. When a signal is placed on the CAN bus the CAN-H line is at a higher voltage than the CAN-L line. Each electronic control unit have its own CAN identity code, like an address (may respond to several CAN id codes). If an electronic control unit is to communicate to another it will need to know the CAN identity code of the recipient.

A simple check to see if the CAN bus is in use in a vehicle, and accessible via the OBD socket, is to connect a resistance meter across pin 6 and pin 14. Due to the combined resistance of the two termination resistors at 120 Ohms each the overall resistance should be read as 60 Ohms.

OBD-2 110 provides access to numerous other data from the Engine Control Unit (ECU) and offers a valuable source of information when troubleshooting problems inside a vehicle. The Society of Automotive Engineers (SAE) J1979 standard defines a method for requesting various diagnostic data and a list of standard parameters that are available from the ECU and other devices 12, 14, 16, 98-106 in the vehicle 122. The various parameters that are available are addressed by parameter identification numbers or Parameter IDentifiers (PIDs), which are defined in SAE J1979, which is incorporated herein by reference.

OBD-2 PIDs (On-board diagnostics Parameter IDs) are codes used to request data from a vehicle, used as a diagnostic tool. SAE standard J/1979 defines many PIDs, but manufacturers also define many more PIDs specific to their vehicles. All light duty vehicles (i.e. less than 8,500 pounds) sold in North America since 1996, as well as medium duty vehicles (i.e. 8,500-14,000 pounds) beginning in 2005, and heavy duty vehicles (i.e. greater than 14,000 pounds) beginning in 2010, were required to support OBD-2 diagnostics, using a standardized data link connector, and a subset of the SAE J/1979 defined PIDs (or SAE J/1939 as applicable for medium/heavy duty vehicles), primarily for state mandated emissions inspections.

Typically, an automotive technician uses PIDs with a scan tool connected to the vehicle's integral OBD-2 connector 120. The technician enters the PID The scan tool sends it to the vehicle's controller-area network (CAN)-bus, VPW, PWM, ISO, KWP. (After 2008, CAN only). A device on the bus recognizes the PID as one it is responsible for, and reports the value for that PID to the bus. The scan tool reads the response, and displays it to the technician.

The apparatus OBD-2 apparatus 110 uses the CAN bus and OBD-2 PIDs to obtain information from the various components of the vehicle 122.

In one embodiment, the apparatus 110 includes its own new and unique OBD-2 PIDs to practice the invention. However, the present invention is not limited to such an embodiment and the invention can be practiced with and/or with new unique OBD-2.

AUTOMATIC CREATION OF DRIVER Telematic SIGNATURES

A "habit" is a routine of behavior that is repeated regularly and tends to occur unconsciously. The American Journal of Psychology in 1903, stated, "a habit, from the standpoint of psychology, is a more or less fixed way of thinking, willing, or feeling acquired through previous repetition of a mental experience." Habitual behavior often goes unnoticed in persons exhibiting it, because a person does not need to engage in self-analysis when undertaking routine tasks such as driving. Habits are sometimes compulsory. The process by which new behaviors become automatic is habit formation. Old habits are hard to break and new habits are hard to form because the behavioral patterns we repeat are imprinted in our neural pathways and do not change frequently.

As behaviors are repeated in a consistent context, there is an increase in the link between the context and the action. This increases the automaticity of the behavior in that context. Features of an automatic behavior are all or some of: efficiency, lack of awareness, un-intentionality, un-controllability.

"Habit formation" is thus a process by which a behavior, through regular repetition, becomes automatic. A driving habit thus becomes an acquired behavior pattern regularly followed until it has becomes involuntary. Since most drivers in the United States start driving at a very early age, such as age 15 or 16, a 30 year old driver will operate a vehicle with involuntary driving habits practiced repeatedly (e.g., daily, etc.) over a period of 15 years.

"Habit evidence" is a term used in the law of evidence in the United States to describe any evidence submitted for the purpose of proving that a person acted in a particular way on a particular occasion based on that person's tendency to reflexively respond to a particular situation in a particular way and without voluntary thought. Habit evidence includes habit evidence for a driver driving a vehicle.

Additional information about using habits can be found in the book, "The Power of Habit: Why We Do What We Do in Life and Business," by Charles Duhigg, Random House, 2014, ISBN-978-0812981605, the contents of which are incorporated by reference.

In the present invention, it has been determined experimentally by examining a number of data sets that a driver of a vehicle can be identified with a very high level of accuracy (e.g., 95% or more, etc.) based on the unique "driving habits" of the driver. The driver habits include, but are not limited to driving characteristics such as acceleration curves, de-acceleration curves, braking, driving speeds, fuel consumption, rpm data, etc., driving routes including GPS time and location data, days of the week of driving activities, time of day of driving activities, etc. The habits of a driver of a vehicle are collected and stored with an on-board diagnostics (OBD) apparatus and/or in association with a smart phone and/or tablet, and/or a standalone data correction device, etc. to positively identify and verify the driver of the vehicle.

Figure 9B:
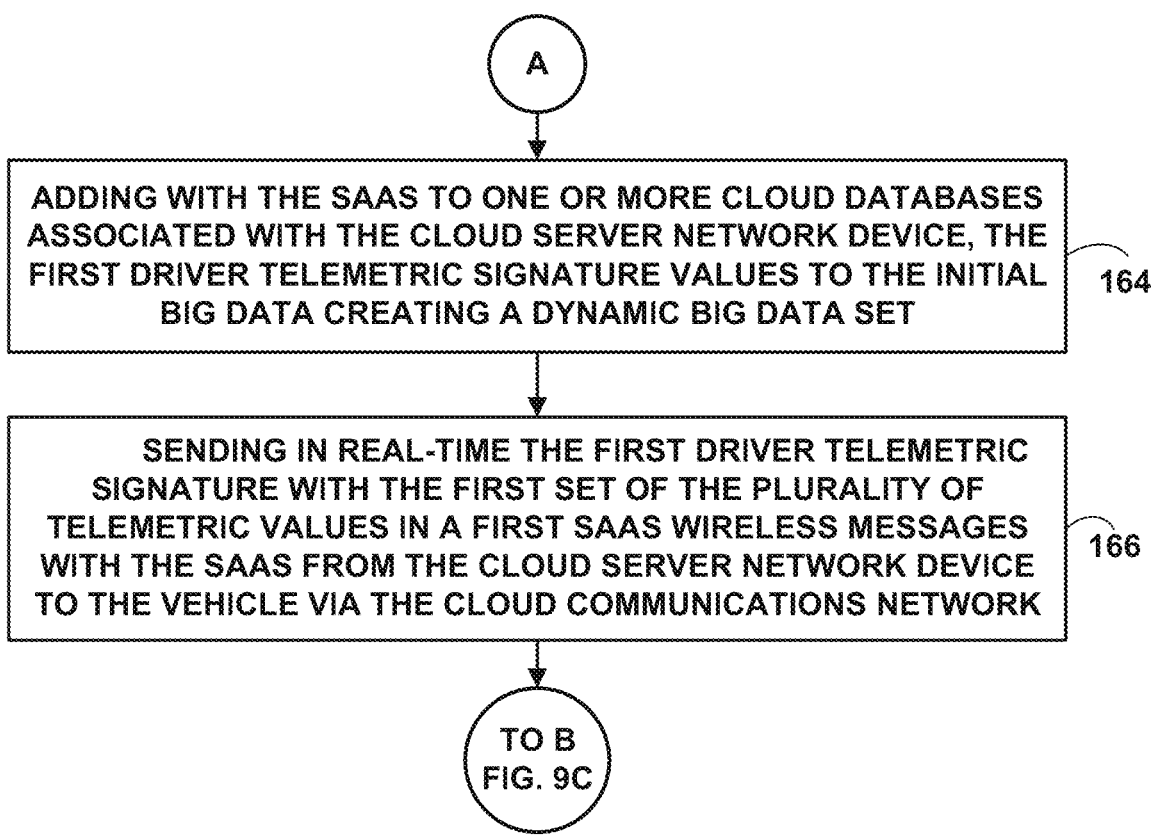
Figure 9C:
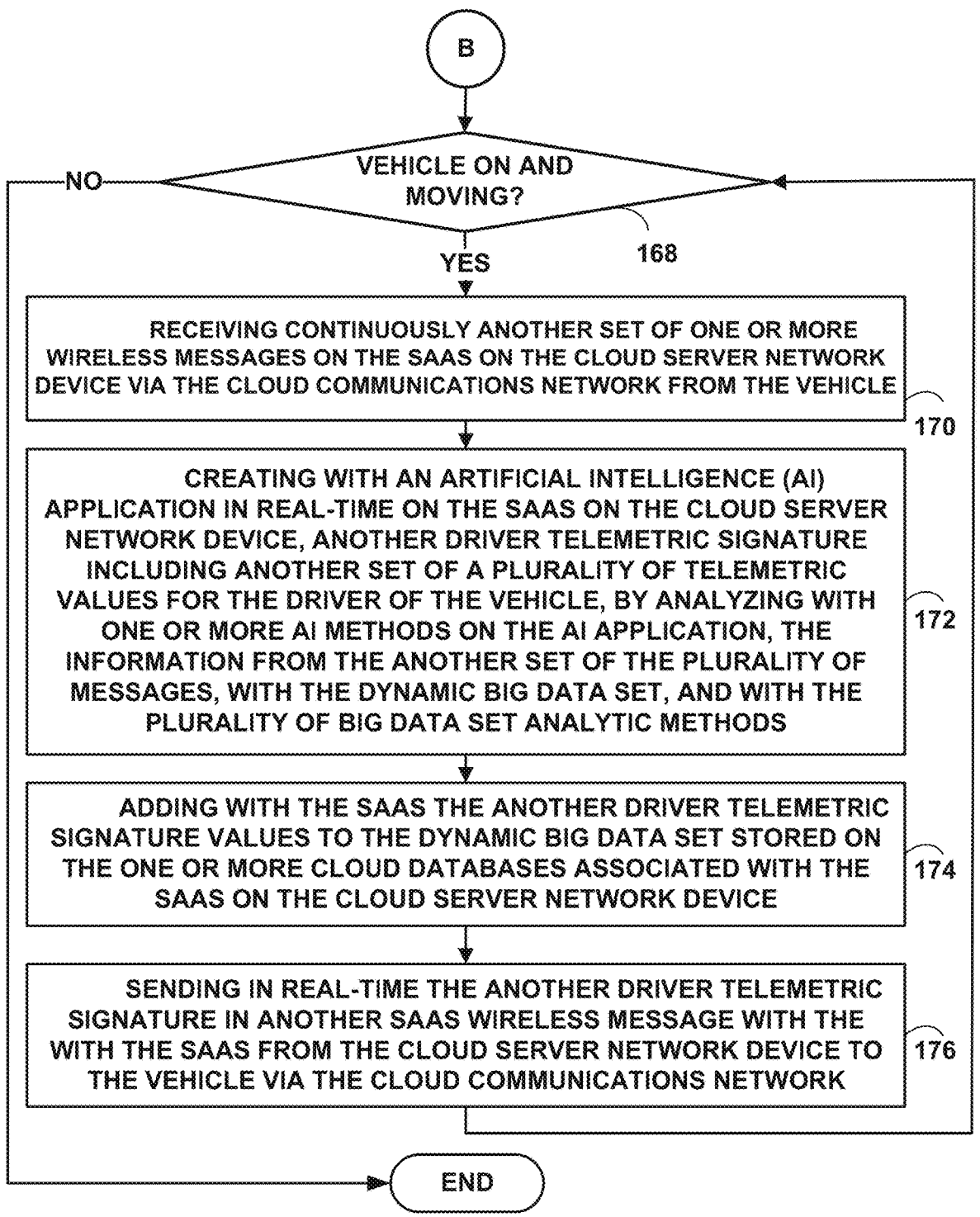

FIGS. 9A, 9B and 9C are a flow diagram illustrating a Method 158 for automatically creating driver Telematic signatures.

In FIG. 9A at Step 160, a first set of one or more wireless messages is received on a cloud Software as a Service (SaaS) on a cloud server network device with one or more processors via a cloud communications network from a vehicle, wherein the first set of one or more wireless message is sent from: (1) a first network device with one or more processors plugged into a port on the vehicle, or (2) from a second network device within the vehicle with one or more processors, wherein the vehicle is turned on and is moving. At Step 162, the SaaS on the cloud server network device creates in real-time a first driver telematic signature including a first set of plural telematic values for a driver of the vehicle. The first driver telematic signature created with the information from first set of one or more messages, with an initial Big Data set with X-number of set members, wherein X is a positive number greater than at least 100,000, and with plural Big Data set analytic methods. The initial Big Data set including plural initial driver telematic signature information values created with the plural Big Data set analytic methods comprising: predictive analytic methods, driver behavior analytic methods, vehicle performance analytic methods, weather analytic methods, road condition analytic methods, terrain analytic methods and cultural analytic methods, the methods computing values for the initial Big Data set with the X-number of set members. In FIG. 9B at Step 164, the SaaS adds the first driver telematic signature values to the initial Big Data creating a dynamic Big Data set and stores the new dynamic Big Data set in one or more cloud databases associated with the cloud server network device. At Step 166, the first driver telematic signature is sent in real-time with the first set of the plural telematic signature values in a first SaaS wireless messages from the SaaS from the cloud server network device to the vehicle via the cloud communications network.

In FIG. 9C at Step 168, a test is continuously conducted to determine if the vehicle is still on and moving. If the vehicle is still on and moving, at Step 170 another set of one or more wireless messages is continuously received on the SaaS on the cloud server network device via the cloud communications network from the vehicle. At Step 172, an Artificial Intelligence (AI) application on the SaaS on the cloud server network device creates another driver telematic signature including another set of plural telematic values for the driver of the vehicle, by analyzing via one or more AI methods on the AI application, with the information from the another set of the plural messages, with the dynamic Big Data set, and with the plural Big Data set analytic methods. At Step 174, the SaaS adds the another driver telematic signature values to the dynamic Big Data set stored the one or more cloud databases associated with the SaaS on the cloud server network device. At Step 176, the SaaS sends in real-time the another driver telematic signature in another SaaS wireless message from the cloud server network device to the vehicle via the cloud communications network, thereby providing a device-independent and vehicle-independent, AI analyzed and dynamic Big Data set calibrated, driver safety scoring system with the SaaS on the cloud server network device and the cloud communications network.

The Method of FIG. 9 is illustrated with an exemplary embodiment. However, the present invention is not limited to this exemplary embodiment and other embodiments can be used to practice the invention.

In such an exemplary embodiment, in FIG. 9A at Step 160, Step 160, a first set of one or more wireless messages is received on a cloud Software as a Service (SaaS) 64 on a cloud server network device 20 with one or more processors via a cloud communications network 18 from a vehicle 122, wherein the first set of one or more wireless message is sent from: (1) a first network device (e.g., OBD-2 110, etc.) with one or more processors plugged into a port on the vehicle, or (2) from a second network device 12, 14, 16, 98-106, 150 within the vehicle 122 with one or more processors, wherein the vehicle 122 is turned on and is moving.

In one embodiment of the invention, the driver is a human driver. In another embodiment of the invention, the driver of the vehicle is a non-human automated autonomous driver. In such an embodiment, the vehicle 122 comprises a self-driving vehicle 122 and the SaaS 64 creates driver telematic signatures for the automated autonomous driver. However, the present invention is not limited to such an embodiment.

At Step 162, the SaaS 64 on the cloud server network device 20 creates in real-time a first driver telematic signature 13a including a first set of plural telematic values for a driver 128 of the vehicle 122. The first driver telematic signature 13a is created with the information from first set of one or more messages, with an initial Big Data set 105 with X-number of set members, wherein X is a positive number greater than at least 100,000, and typically 500,000 to 1 Million+ and with plural Big Data set analytic methods. The initial Big Data set 105 includes plural initial driver telematic signature information values 13a, 15a created with the plural Big Data set analytic methods comprising: predictive analytic methods, driver behavior analytic methods, vehicle performance analytic methods, weather analytic methods, road condition analytic methods, terrain analytic methods and cultural analytic method, the methods computing values for the initial Big Data set 105 with the X-number of set members.

"Big Data" refers to the use of predictive analytic methods that extract value from data, and to a particular size of data set. The quantities of data used are very large and typically 500,000 to 1 Million+data points. Analysis of Big Data sets are used to find new correlations and to spot trends.

In one embodiment, the driver telematic signatures 13a, 13b, 15a created by the SaaS 64 and/or the AI application 65 on the SaaS 64 include "weighted" and "normalized" driver telematic signature values. The weighting and normalizing techniques applied to the data provide driver telematic signature values that are more accurate and less subject to data anomalies. The weighting and normalizing also provide in part, device-independent and vehicle-independent driver telematics signatures. However, the present invention is not limited to this embodiment and other types of driver telematic signature values can be used to practice the invention.

A "weighted" variable provides a value (i.e., the weight, etc.) for each observation in a data set. The $i^{th}$ weight value, $w_i$, is a weight for the $i^{th}$ observation. For most applications, a valid weight is nonnegative. A zero weight usually indicates the observation is excluded from the analysis. Observations that have relatively large weights have more influence in the data analysis than observations that have smaller weights. An unweighted analysis is the same as a weighted analysis in which all weights are equal to one.

A "normalization" of data refers to the creation of shifted and scaled versions of data values, where the intention is that these normalized data values allow the comparison of corresponding normalized values for different datasets in a way that eliminates effects of certain gross influences, such as those created by anomalies. An "anomaly" is a deviation in a quantity from an expected value (e.g., a difference between a measurement and a mean and/or a model prediction). Similarly, a standardized anomaly equals an anomaly divided by a standard deviation.

In FIG. 9B at Step 164, the SaaS 64 adds the first driver telematic signature values 13a to the initial Big Data set 105 creating a dynamic Big Data set 107 and saves the dynamic Big Data sent 107 in one or more cloud databases 20' (and e.g. 24', etc.) associated with the cloud server network device 20 on the cloud communications network 18.

At Step 166, the first driver telematic signature 13a is sent in real-time with the first set of the plural telematic signature values in a first SaaS wireless messages from the SaaS 64 from the cloud server network device 20 to the vehicle 122 via the cloud communications network 18.

In FIG. 9C at Step 168, a test is continuously conducted to determine if the vehicle 122 is still on and moving.

If the vehicle 122 is still on and moving, at Step 170 another set of one or more wireless messages is continuously received on the SaaS 64 on the cloud server network device 20 via the cloud communications network 18 from the vehicle 122.

At Step 172, an Artificial Intelligence (AI) application 65 on the SaaS 64 on the cloud server network device 18 creates in real-time another driver telematic signature 13b including another set of plural telematic values for the driver 128 of the vehicle 122, by analyzing via one or more AI methods on the AI application 65, with the information from the another set of the plural messages, with the dynamic Big Data set 107, and with the plural Big Data set analytic methods.

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the one or more AI methods include, but are not limited to knowledge-based systems for time series analyses, in particular AI methods for eliminating variations in vehicle 122 type and device type 110, 12, 14, 16, 98-106, 150 used to collected driver 128 data from vehicles 122 in statistical studies, and for multivariate tabular analysis. However, the present invention is not limited to such an embodiment and more, fewer and/or other AI methods can be used to practice the invention.

Multivariate tabular analysis (MVA) involves observation and analysis of more than one statistical outcome variable at a time using tables of data. In design and analysis, the technique is used to perform studies across multiple dimensions while taking into account the effects of all variables on the responses of interest.

In one embodiment, SaaS 64 includes and AI application 65. In another embodiment, the AI application 65 is a standalone application. However, the present invention is not limited to such an embodiment, and the AI application can be provided in other than the SaaS 64.

At Step 174, the SaaS adds the another driver telematic signature values 13b to the dynamic Big Data 107 set stored in the one or more cloud databases 20', 24' associated with the SaaS 64 on the cloud server network device 20.

At Step 176 the SaaS 64 sends in real-time the another driver telematic signature 13b in another SaaS wireless message from the cloud server network device 20 to the vehicle 122 via the cloud communications network 18, thereby providing a device-independent and vehicle-independent, AI 65 analyzed and dynamic Big Data 106 set calibrated, driver safety scoring system with the SaaS 64 on the cloud server network device 20 and the cloud communications network 18.

Therefore, the driver telematics signatures 13a, 13b, 15a are used to determine a first driver's current driving behavior and a second driver's current driving behavior in real-time even if the first driver is driving a vehicle 122 including a mini-van and the second driver is driving a vehicle 122' including a sports car The driver telematics signatures 13a, 13b, 15a, 15b are also used to determine a first driver's current driving behavior 13a and a second driver's current driving behavior 15b in real-time even if the first driver's driving data was collected by an OBD-2 plugged into the ODB-2 port on the first driver's vehicle 122 and the second driver's data was collected by a smartphone 12 included within the passenger compartment of the second driver's vehicle 122'.

In one embodiment, the driver safety scoring includes an exemplary scoring system with the exemplary moniker test and exemplary numerical ranges as illustrated in Table 5. However, the present invention is not limited to such an embodiment and other driver scoring systems with other numerical ranges and/or other scoring system parameters can be used to practice the invention.

TABLE 5

| | |
|---|---|
| 90-100 | Excellent Driver |
| 80-90 | Good Driver |
| 70-80 | Average Driver |
| 60-70 | Poor Driver |
| <60 | At Risk Driver |

FIG. 10 is a flow diagram illustrating a Method 178 for creating a driver telematic signature.

In FIG. 10 at Step 180, plural initial sets of one or more wireless messages are received on the cloud SaaS on the cloud server network device via the cloud communications network from plural initial vehicles. The plural initial vehicles are turned on and are moving. At Step 182, the SaaS creates in real-time plural initial driver telematic signatures for plural initial drivers for the plural initial vehicles on the SaaS on the cloud server network device. The plural initial driver telematic signatures created on the SaaS with the information from plural initial sets of one or more wireless messages, with the AI application, and with the plural Big Data set analytic methods, to create the initial Big Data set. At Step 184, the SaaS store the plural initial driver telematic signature values and the initial Big Data set in the one or more cloud databases associated with the cloud server network device.

The Method of FIG. 10 is illustrated with an exemplary embodiment. However, the present invention is not limited to this exemplary embodiment and other embodiments can be used to practice the invention.

In such an exemplary embodiment, in FIG. 10 at Step 180, plural initial sets of one or more wireless messages are received on the cloud SaaS 64 on the cloud server network device 20 via the cloud communications network 18 from plural initial vehicles 122, 122' (only two of which is illustrated for simplicity). The plural initial vehicles 122, 122' are turned on and are moving. In an actual embodiment, the plural initial vehicles would include data form at least 100,000 vehicles and typically 500,000 to 1 Million+ vehicles.

At Step 182, the SaaS 64 creates in real-time plural initial driver telematic signatures 13a, 15a (only two of which are illustrated for simplicity) for plural initial drivers 128 for the plural initial vehicles 122, 122' on the SaaS 64 on the cloud server network device 20. The plural initial driver telematic signatures 13a, 15a created on the SaaS with the information from plural initial sets of one or more wireless messages, with the AI application 65, and with the plural Big Data set analytic methods, to create the initial Big Data set 105.

AI and/or Big Data driver telematic signature creation methods are used in real-time via cloud SaaS services. Massive amounts of structured and unstructured driver telematic data is collected from and/or plural vehicles 122, 122' and other multiple sources (e.g., other vehicle and driver related databases, etc.) over long periods of time (e.g., several years, etc.) from plural drivers 128, 128' and stored on the cloud computing network 18. AI and/Big Data real-time driver telematic signature creation methods are used to find patterns of driver habits and driver behavior and data anomalies in the driver telematic signature data and also used to predict behaviors and use patterns of vehicles 122 of a very large number of drivers 128 (e.g., 500,000–1Million+, etc.).

In one embodiment, Method 178 is used to create the initial Big Data set 105 used in Method 158 and changed in real-time as the SaaS 64 receives new and additional data for plural driver 128, 128', from plural vehicles 122, 122'. However, the present invention is not limited to such and embodiment and other embodiments can be used to practice the invention.

Both AI and Big Data are also used to create visualizations 192 of large data sets. Visualization 192, such as charts, graphs and other displays of the data are used to analyze the data, to spot trends and spot anomalies 194. For example, displayed on display component 34 of a target network device 12, 14, 16, 96-108, etc.

Figure 11:
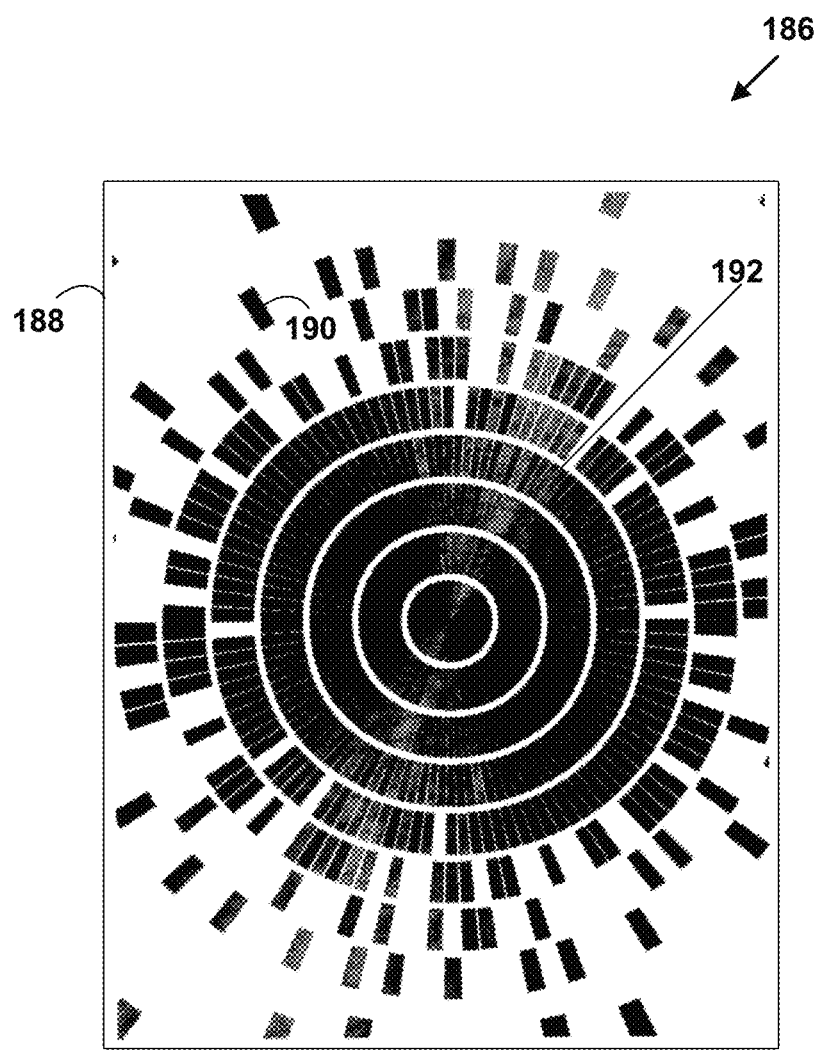
FIG. 11 is a block diagram illustrating a visual display of BIG Data set including driver telematic signature data values.

FIG. 11 is a block diagram 186 illustrating a visual display of BIG Data set 188 including driver telematic signature values.

In FIG. 11, driver telematic signature data set 190 is an example of an anomaly as it falls outside a majority of the other driver telematic signature data sets 192. However, the present invention is not limited to such embodiments and more, fewer and/or other Big Data visual displays and layouts and/or methods can be used to practice the invention.

Visualization, such as charts, graphs and other displays of the data can be used by humans to analyze the vehicle data, to spot trends and spot anomalies 192. However, present invention does not require any human intervention to analyze any vehicle data. The SaaS 64 and/or the AI application 65 analyzes the vehicle data directly and does require any visual analysis. However, the SaaS and AI application in the SaaS can also conduct automatic visual analysis of the vehicle data.

Figure 12:
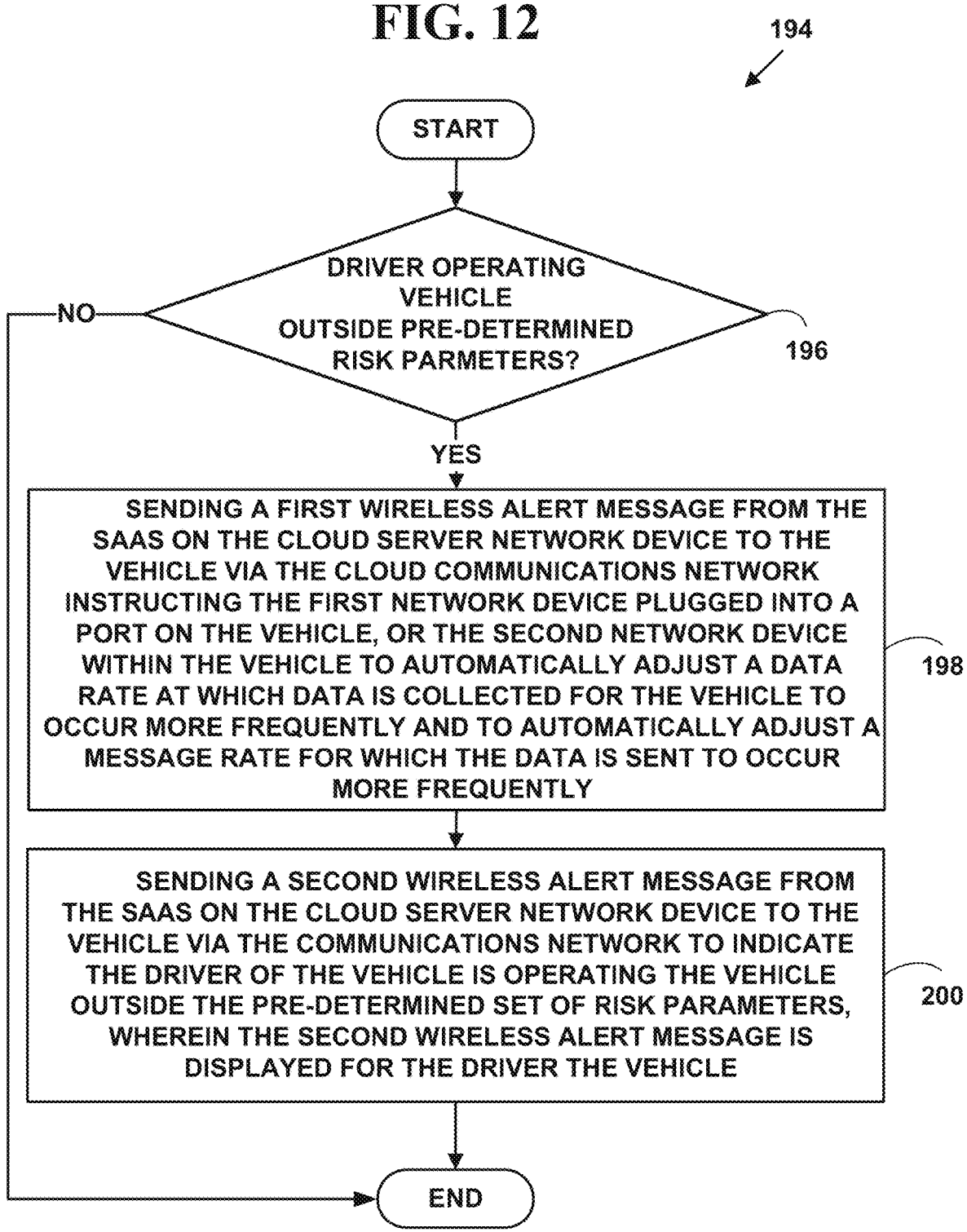
FIG. 12 is a flow diagram illustrating a method for automatically creating driver telematic signatures.

FIG. 12 is a flow diagram illustrating a Method 194 for creating a driver telematic signature.

In FIG. 12, at Step 196, the SaaS on the cloud server network device conducts a test to determine with the another driver telematic signature whether the driver of the vehicle is operating the vehicle outside a pre-determined set of risk parameters. If the driver of the vehicle is operating the vehicle outside the pre-determined set of risk parameters at Step 198, a first wireless alert message from the SaaS on the cloud server network device to the vehicle via the cloud communications network instructing the first network device plugged into a port on the vehicle, or the second network device within the vehicle to automatically adjust a data rate at which data is collected for the vehicle to occur more frequently and to automatically adjust a message rate for which the data is sent to occur more frequently. At Step 200, a second wireless alert message is sent from the SaaS on the cloud server network device to the vehicle via the communications network to indicate the driver of the vehicle is operating the vehicle outside the pre-determined set of risk parameters, wherein the second wireless alert message is displayed for the driver the vehicle.

The method of FIG. 12 is illustrated with an exemplary embodiment. However, the present invention is not limited to this exemplary embodiment and other embodiments can be used to practice the invention.

In such an exemplary embodiment, in FIG. 12 at Step 196, the SaaS 64 on the cloud server network device 20 conducts a test in real-time to determine with the another driver telematic signature 13b whether the driver 128 of the vehicle 122 is operating the vehicle 122 outside a pre-determined set of risk parameters. For example, the driver may be speeding, breaking suddenly and continuously indicating the driver may tailgating another vehicle, driving too fast for current weather conditions (e.g., snow, ice, rain, fog, etc.), accelerating frequently, etc. and the driver's 128 diver telematic signature 15b indicates within the driver safety scoring system (e.g., Table 5, etc.) that the driver 128 is an "At Risk" driver and is engaging in risky driving behaviors that could result in the driver 122 getting into an accident.

If the driver 128 of the vehicle 122 is operating the vehicle 122 outside the pre-determined set of risk parameters at Step 198, a first wireless alert message is sent from the SaaS 64 on the cloud server network device 20 to the vehicle 122 via the cloud communications network 18 instructing the first network device (e.g., OBD-2 110, etc.) plugged into a port on the vehicle 122, or the second network device 12, 14, 16, 98-106, 150 within the vehicle 122 to automatically adjust a data rate at which data is collected for the vehicle to occur more frequently and to automatically adjust a message rate for which the data is sent to occur more frequently.

At Step 200, a second wireless alert message is sent from the SaaS 64 on the cloud server network device 20 to the vehicle 122 via the cloud communications network 18 to indicate the driver 128 of the vehicle 122 is operating the vehicle 122 outside the pre-determined set of risk parameters, wherein the second wireless alert message is displayed for the driver 128 the vehicle 128.

In one embodiment, second wireless alert message is displayed for the driver of the vehicle with an audio indication or a visual indication. The audio indication includes, but is not limited to a sound sent into a speaker on the vehicle. The visual indication, includes, but is not limited to, an electronic message (e.g., text message, e-mail message, etc.), a change in a status of a light bulb (e.g., change in color, change to blinking, etc.), an audio visual message displayed on a display component within the vehicle 122 (e.g., display console, etc.) and/or on a display component on the target network device 12, 14, 16, 98-106 or standalone network device 150 with the vehicle. However, the present invention is not limited to the audio and visual indications described and more, fewer and/or types of audio and visual indications can be used to practice the invention.

Figure 13:
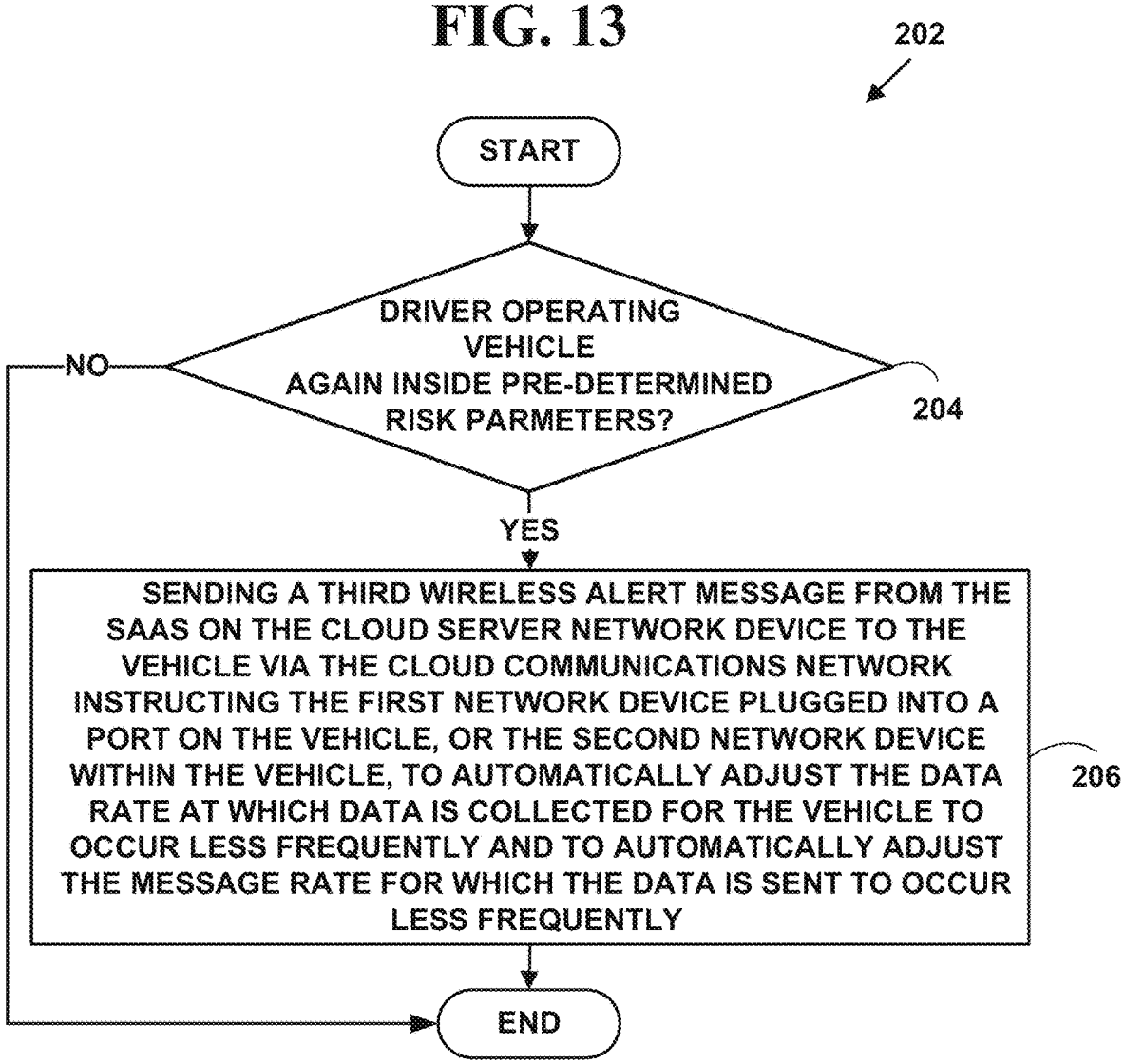
FIG. 13 is a flow diagram illustrating a method for automatically creating driver telematic signatures.

FIG. 13 is a flow diagram illustrating a Method 202 for automatically creating driver telematic signatures.

In FIG. 13 at Step 204, determining in real-time on SaaS on the cloud server network device whether the driver of the vehicle is again operating the vehicle within the pre-determined set of risk parameters. If the driver of the vehicle is again operating the vehicle within the pre-determined set of risk parameters, at Step 204 sending a third wireless alert message from the SaaS on the cloud server network device to the vehicle via the cloud communications network instructing the first network device plugged into a port on the vehicle, or the second network device within the vehicle to automatically adjust the data rate at which data is collected for the vehicle to occur less frequently and to automatically adjust the message rate for which the data is sent to occur less frequently.

The method of FIG. 13 is illustrated with an exemplary embodiment. However, the present invention is not limited to this exemplary embodiment and other embodiments can be used to practice the invention.

In such an exemplary embodiment, in FIG. 13 at Step 202 a test is conducted in real-time on SaaS 64 on the cloud server network device 20 to determine with the another driver telematic signature 13b whether the driver 128 of the vehicle 122 is again operating the vehicle 122 within the pre-determined set of risk parameters.

If the driver 128 of the vehicle 122 is again operating the vehicle 122 within the pre-determined set of risk parameters, at Step 204 sending a third wireless alert message from the SaaS 64 on the cloud server network device 20 to the vehicle 122 via the cloud communications network 18 instructing the first network device (e.g. OBD-2 110, etc.) plugged into a port on the vehicle 122, and/or the second network device 12 14, 16, 98-106, 150 within the vehicle 122 to automatically adjust the data rate at which data is collected for the vehicle 122 to occur less frequently and to automatically adjust the message rate for which the data is sent to occur less frequently.

The methods of FIGS. 12 and 13 allow real-time adjustment data collection, message rates and behavior of the driver 128 that is driving vehicle 122 using driver telematic signatures 13b created in real-time by the SaaS 64.

Figure 14:
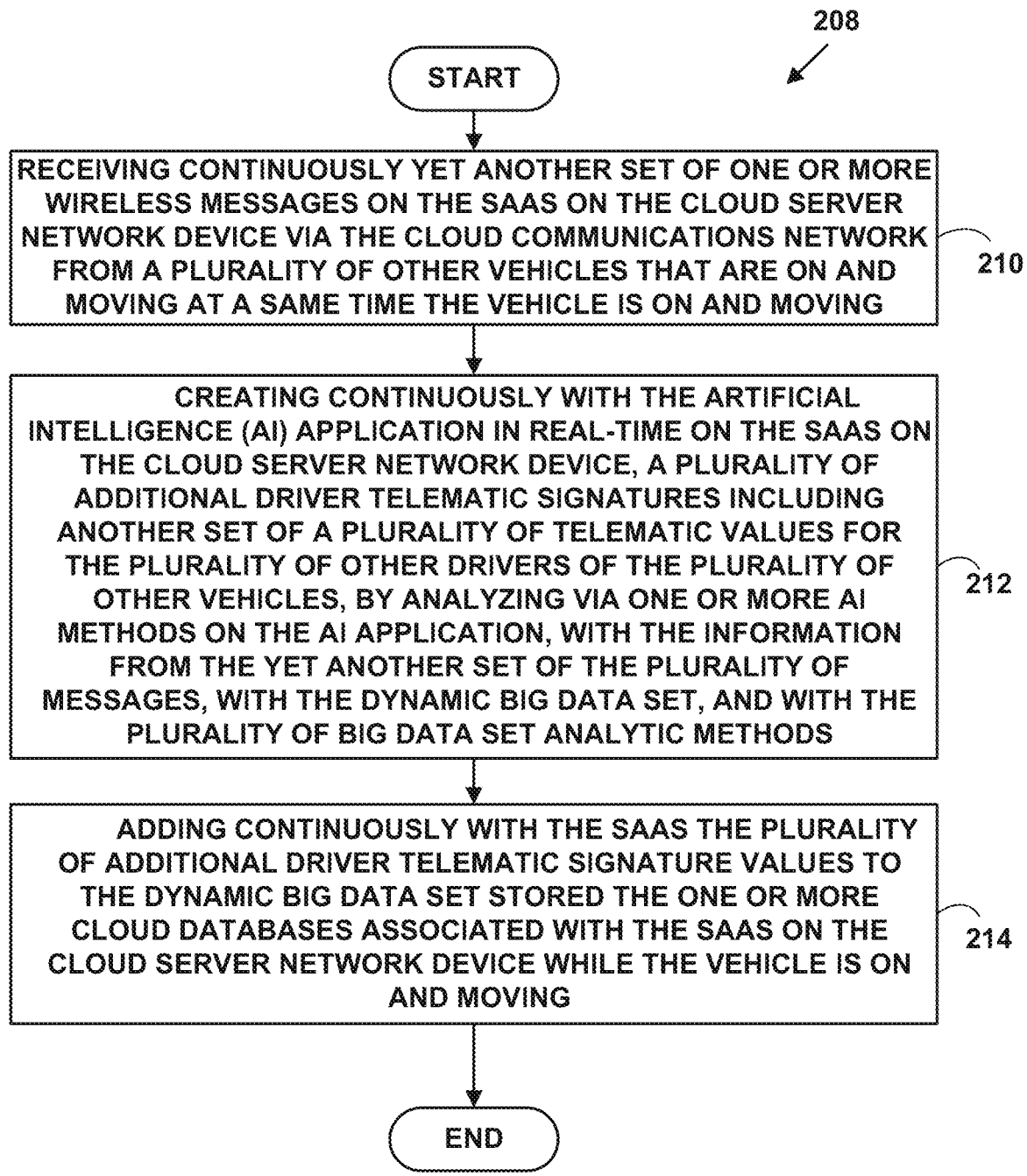
FIG. 14 is a flow diagram illustrating a method for automatically creating driver telematic signatures.

FIG. 14 is a flow diagram illustrating a Method 208 for automatically creating driver telematic signatures.

In FIG. 14 at Step 210, the SaaS on the cloud server network device receives continuously yet another set of one or more wireless messages via the cloud communications network from plural other vehicles that are on and moving at a same time the vehicle is on and moving. At Step 212, the Artificial Intelligence (AI) application in real-time on the SaaS on the cloud server network device creates plura additional driver telematic signatures including another set of plural telematic values for the plural other drivers of the plural other vehicles, by analyzing via one or more AI methods on the AI application, with the information from the yet another set of the plural messages, with the dynamic Big Data set, and with the plural Big Data set analytic methods. At Step 214, the SaaS continuously adds the plural additional driver telematic signature values to the dynamic Big Data set stored the one or more cloud databases associated with the SaaS on the cloud server network device.

The method of FIG. 14 is illustrated with an exemplary embodiment. However, the present invention is not limited to this exemplary embodiment and other embodiments can be used to practice the invention.

In such an exemplary embodiment, in FIG. 14 Step 210, the SaaS 64 on the cloud server network device 20 receives continuously yet another set of one or more wireless messages via the cloud communications network 18 from plural other vehicles 122' that are on and moving at a same time the vehicle 122 is on and moving.

At Step 212, the Artificial Intelligence (AI) application 64 continuously in real-time on the SaaS 64 on the cloud server network device 20 creates plural additional driver telematic signatures 15b including another set of plural telematic values for the plural other drivers 128' of the plural other vehicles 122', by analyzing via one or more AI methods on the AI application 65, with the information from the yet another set of the plural messages, with the dynamic Big Data set 107, and with the plural Big Data set analytic methods.

At Step 214, the SaaS 64 continuously adds the plural additional driver telematic signature 15b values to the dynamic Big Data set 107 stored the one or more cloud databases 20', 24' associated with the SaaS 64 on the cloud server network device 20 while the vehicle 122 is on and moving.

Method 208 allows the driver 128 of the vehicle to continuously receive a driver telematics signature 13b that is continuously update using the dynamic Big Data set 107 that is continuously update with additional data 15b from plural other vehicles 122'. Method 208 allows the driver 128 to always receive a most up to date driver telematics signature 13b.

A method and system is described herein for creating driver telematic signatures. The method and system include a system architecture for telematics. The driver telematic signatures include device-independent and vehicle-independent, artificial intelligence (AI) analyzed and dynamic Big Data set (e.g., 100,000–1 Million+ data values) calibrated, driver safety scoring system. The driver telematics signatures are created and used in real-time from a cloud Software as a Service (SaaS) on a cloud server network device and a cloud communications network that communicates with a driver's vehicle when it is on and moving. The driver telematics signatures provide current driver performance data, driver habit data and allow determination in real-time of drivers performing risky driver maneuvers. The driver telematics signature are also used to determine a cost of insurance for vehicles.

It should be understood that the architecture, programs, processes, methods and systems described herein are not related or limited to any particular type of computer or network system (hardware or software), unless indicated otherwise. Various types specialized systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware and/or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

We claim:

1. A method for automatically creating driver telematic signatures, comprising:

receiving a first set of one or more wireless messages on a cloud Software as a Service (SaaS) on a cloud server network device with one or more processors via a cloud communications network from a vehicle, wherein the first set of one or more wireless message is sent from: (1) a first network device with one or more processors plugged into a port on the vehicle, or (2) from a second network device within the vehicle with one or more processors, wherein the vehicle is turned on and is moving;

creating in real-time with the SaaS on the cloud server network device a first driver telematic signature including a first set of a plurality of telematic values for a driver of the vehicle including initial driver performance data, initial driver habit data and an initial set of driving maneuvers, the first driver telematic signature created with the information from the first set of one or more messages, and with an initial Big Data set with X-number of set members, wherein the X-number of set members in the Big Data set include telematic signature values collected from other drivers, wherein X is a positive number greater than at least 100,000, and with a plurality of Big Data set analytic methods, the initial Big Data set including a plurality of initial driver telematic signature information values created with the plurality of Big Data set analytic methods comprising: predictive analytic methods, driver behavior analytic methods, vehicle performance analytic methods, weather analytic methods, road condition analytic methods, terrain analytic methods and cultural analytic methods, the methods computing values for the initial Big Data set with the X-number of set members, the first driver telematic signature independent of how components in the first network device plugged into the port on the vehicle operate, or independent of how components the second network device within the vehicle operate, and independent of a vehicle type;

adding with the SaaS to one or more cloud databases associated with the cloud server network device, the first driver telematic signature values to the initial Big Data creating a dynamic Big Data set;

sending in real-time the first driver telematic signature with the first set of the plurality of telematic values in a first SaaS wireless message with the SaaS from the cloud server network device to the vehicle via the cloud communications network;

(a) receiving continuously another set of one or more wireless messages on the SaaS on the cloud server network device via the cloud communications network from the vehicle;

(b) creating continuously in real-time as long as the vehicle is on and is moving with an Artificial Intelligence (AI) application in real-time on the SaaS on the cloud server network device, a subsequent driver telematic signature, including another set of a plurality of telematic values for the driver of the vehicle comprising current driver performance data, current driver habit data and a current set of driver maneuvers, by analyzing via one or more AI methods on the AI application, with the information from the another set of the plurality of messages, with the dynamic Big Data set, and with the plurality of Big Data set analytic methods, the subsequent driver telematic signature also independent of how the components on the first network device plugged into the port on the vehicle operate, or also independent of how the components of the second network device within the vehicle operate and also independent of the vehicle type;

(c) adding with the SaaS the another set of driver telematic signature values to the dynamic Big Data set stored in the one or more cloud databases associated with the SaaS on the cloud server network device;

(d) sending in real-time the created subsequent driver telematic signature for the driver in another SaaS wireless message from the SaaS from the cloud server network device to the vehicle via the cloud communications network; and repeating steps (a) through (d) in real-time as long as the vehicle is on and is moving, thereby providing a device-independent and vehicle-independent, AI analyzed and dynamic Big Data set calibrated, driver safety scoring system, with the SaaS on the cloud server network device and the cloud communications network.

2. A non-transitory computer readable medium having stored therein a plurality of instructions configured for causing one or more processors on one or more network devices to execute a plurality of steps comprising:

receiving a first set of one or more wireless messages on a cloud Software as a Service (SaaS) on a cloud server network device with one or more processors via a cloud communications network from a vehicle, wherein the first set of one or more wireless message is sent from: (1) a first network device with one or more processors plugged into a port on the vehicle, or (2) from a second network device within the vehicle with one or more processors, wherein the vehicle is turned on and is moving;

creating in real-time with the SaaS on the cloud server network device a first driver telematic signature including a first set of a plurality of telematic values for a driver of the vehicle including initial driver performance data, initial driver habit data and an initial set of driving maneuvers, the first driver telematic signature created with the information from the first set of one or more messages, and with an initial Big Data set with X-number of set members, wherein the X-number of set members in the Big Data set include telematic signature values collected from other drivers, wherein X is a positive number greater than at least 100,000, and with a plurality of Big Data set analytic methods, the initial Big Data set including a plurality of initial driver telematic signature information values created with the plurality of Big Data set analytic methods comprising:

predictive analytic methods, driver behavior analytic methods, vehicle performance analytic methods, weather analytic methods, road condition analytic methods, terrain analytic methods and cultural analytic methods, the methods computing values for the initial Big Data set with the X-number of set members, the first driver telematic signature independent of how components in the first network device plugged into the port on the vehicle operate, or independent of how components the second network device within the vehicle operate, and independent of a vehicle type;

adding with the SaaS to one or more cloud databases associated with the cloud server network device, the first driver telematic signature values to the initial Big Data creating a dynamic Big Data set;

sending in real-time the first driver telematic signature with the first set of the plurality of telematic values in a first SaaS wireless message with the SaaS from the cloud server network device to the vehicle via the cloud communications network;

(a) receiving continuously another set of one or more wireless messages on the SaaS on the cloud server network device via the cloud communications network from the vehicle;

(b) creating continuously in real-time as long as the vehicle is on and is moving with an Artificial Intelligence (AI) application in real-time on the SaaS on the cloud server network device, a subsequent driver telematic signature, including another set of a plurality of telematic values for the driver of the vehicle comprising current driver performance data, current driver habit data and a current set of driver maneuvers, by analyzing via one or more AI methods on the AI application, with the information from the another set of the plurality of messages, with the dynamic Big Data set, and with the plurality of Big Data set analytic methods, the subsequent driver telematic signature also independent of how the components on the first network device plugged into the port on the vehicle operate, or also independent of how the components of the second network device within the vehicle operate and also independent of the vehicle type;

(c) adding with the SaaS the another set of driver telematic signature values to the dynamic Big Data set stored in the one or more cloud databases associated with the SaaS on the cloud server network device;

(d) sending in real-time the created subsequent driver telematic signature for the driver in another SaaS wireless message from the SaaS from the cloud server network device to the vehicle via the cloud communications network; and repeating steps (a) through (d) in real-time as long as the vehicle is on and is moving, thereby providing a device-independent and vehicle-independent, AI analyzed and dynamic Big Data set calibrated, driver safety scoring system, with the SaaS on the cloud server network device and the cloud communications network.

3. The method of claim 1 wherein the first set of wireless messages sent from the vehicle includes information collected on the first network device plugged into the port on the vehicle comprising: an On-Board-Diagnostic-2 (ODB-2) device plugged into an ODB-2 port on the vehicle.

4. The method of claim 1 wherein the first set of messages sent from the vehicle includes information collected from the second network device within the vehicle comprising: a smartphone, electronic tablet, wearable network device or stand-alone telematic signature network device.

5. The method of claim 1 wherein the cloud server network device, the first network device plugged into the port on the vehicle and the second network device within the vehicle include one or more wireless communications interfaces comprising:

cellular telephone, 802.11a, 802.11b, 802.11g, 802.11n, 802.15.4 (ZigBee), "Wireless Fidelity" (Wi-Fi), Wi-Fi Aware, "Worldwide Interoperability for Microwave Access" (WiMAX), ETSI High Performance Radio Metropolitan Area Network (HIPERMAN), Near Field Communications (NFC), Machine-to-Machine (M2M), Bluetooth or infra data association (IrDA) wireless communication interfaces.

6. The method of claim 1 wherein the cloud server network devices includes a plurality of cloud applications communicating with the first network device plugged into the port on the vehicle or the second network device within the vehicle via the cloud communications network, the plurality of cloud applications providing a plurality of driver telematic signature creation cloud services including: a cloud computing Infrastructure as a Service (IaaS), a cloud computing Platform as a Service (PaaS) and a specific driver telematic signature creation service as the Software as a Service (SaaS).

7. The method of claim 1 wherein the one or more cloud databases include one or more cloud storage objects comprising one or more of a REpresentational State Transfer (REST) or Simple Object Access Protocol (SOAP), Lightweight Directory Access Protocol (LDAP) cloud storage objects, portions thereof, or combinations thereof, stored in the one or more cloud databases.

8. The method of claim 1 wherein the first set of wireless messages and the another set of wireless messages include breaking, turning, acceleration, de-acceleration, rotation, velocity, speed, speed limit, driving time, driving distance, Micro-Electro-Mechanical-Systems (MEMS) information and location information collected for the driver of the vehicle.

9. The method of claim 1 wherein the first set of wireless messages and the another set of wireless messages sent from the vehicle include Micro-Electro-Mechanical-Systems (MEMS) information from MEMS components in the vehicle comprising: airbag system, suspension system, vehicle transmission control system, engine management control system, rollover detection system, vehicle seat comfort system, vehicle navigation system, Global Positioning System (GPS), accelerometer systems, gyroscope systems, electronic parking brake system, or antitheft systems.

10. The method of claim 1 wherein the first network device plugged into a port on the vehicle and the second network device within the vehicle include an accelerometer component, a gyroscope component and a Global Positioning System (GPS) component.

11. The method of claim 1 wherein the driver of the vehicle is an automated autonomous driver, wherein the vehicle comprises a self-driving vehicle and the SaaS creates driver telematic signatures for the automated autonomous driver.

12. The method of claim 1 wherein driver telematic signatures include weighted and normalized driver telematic signature values.

13. The method of claim 1 wherein the one or more AI methods include knowledge-based AI systems including time series analyses for eliminating variations in vehicle type and device type used to collected driver data from vehicles and for multivariate tabular analysis.

14. The method of claim 1 wherein data from the dynamic Big Data set is displayed visually on the cloud server network device.

15. The method of claim 1 further comprising:
receiving continuously yet another set of one or more wireless messages on the SaaS on the cloud server network device via the cloud communications network from a plurality of other vehicles that are on and moving at a same time the vehicle is on and moving;
creating continuously with the Artificial Intelligence (AI) application in real-time on the SaaS on the cloud server network device, a plurality of additional driver telematic signatures including another set of a plurality of telematic values for the plurality of other drivers of the plurality of other vehicles, by analyzing via one or more AI methods on the AI application, with the information from the yet another set of the plurality of messages, with the dynamic Big Data set, and with the plurality of Big Data set analytic methods; and
adding continuously with the SaaS the plurality of additional driver telematic signature values to the dynamic Big Data set stored the one or more cloud databases associated with the SaaS on the cloud server network device while the vehicle is on and moving.

16. The method of claim 1 further comprising:
determining in real-time with the created subsequent driver telematic signature with the SaaS on the cloud server network device whether the driver of the vehicle is operating the vehicle outside a pre-determined set of risk parameters, and if so,
sending a first wireless alert message from the SaaS on the cloud server network device to the vehicle via the cloud communications network instructing the first network device plugged into a port on the vehicle, or the second network device within the vehicle to automatically adjust a data rate at which data is collected for the vehicle to occur more frequently and to automatically adjust a message rate for which the data is sent to occur more frequently; and sending a second wireless alert message from the SaaS on the cloud server network device to the vehicle via the communications network to indicate the driver of the vehicle is operating the vehicle outside the pre-determined set of risk parameters, wherein the second wireless alert message is displayed for the driver the vehicle.

17. The method of claim 16 wherein the second wireless alert message is displayed for the driver of the vehicle with an audio indication or a visual indication.

18. The method of claim 16 further comprising:

determining in real-time on SaaS on the cloud server network device whether the driver of the vehicle is again operating the vehicle within the pre-determined set of risk parameters, and if so, sending a third wireless alert message from the SaaS on the cloud server network device to the vehicle via the cloud communications network instructing the first network device plugged into a port on the vehicle, or the second network device within the vehicle to automatically adjust the data rate at which data is collected for the vehicle to occur less frequently and to automatically adjust the message rate for which the data is sent to occur less frequently.

19. The method of claim 1 further comprising:

receiving a plurality of initial sets of one or more wireless messages on the cloud SaaS on the cloud server network device via the cloud communications network from a plurality of initial vehicles, wherein the plurality of initial vehicles are turned on and are moving;

creating in real-time with the SaaS a plurality of initial driver telematic signatures for a plurality of drivers for the plurality of initial vehicles on the SaaS on the cloud server network device, the plurality of initial driver telematic signatures created on the SaaS with the information from plurality of initial sets of one or more wireless messages, the AI application, and the plurality of Big Data set analytic methods, to create the initial Big Data set; and storing with the SaaS the plurality of initial driver telematic signature values and the initial Big Data set in the one or more cloud databases associated with the cloud server network device.

20. A system for automatically creating driver telematic signatures, comprising in combination:

a plurality of vehicles each with one or more processors;

one or more cloud server network devices each with one or more processors associated with one or more cloud databases;

one or more network devices each with one or more processors;

a cloud communications network with one or more cloud services; and the one or more processors on the one or more server network devices and one or more network devices including a plurality of instructions causing configuration of the one or more processors:

for receiving a first set of one or more wireless messages on a cloud Software as a Service (SaaS) on a cloud server network device with one or more processors via a cloud communications network from a vehicle, wherein the first set of one or more wireless message is sent from: (1) a first network device with one or more processors plugged into a port on the vehicle, or (2) from a second network device within the vehicle with one or more processors, wherein the vehicle is turned on and is moving;

for creating in real-time with the SaaS on the cloud server network device a first driver telematic signature including a first set of a plurality of telematic values for a driver of the vehicle including initial driver performance data, initial driver habit data and an initial set of driving maneuvers, the first driver telematic signature created with the information from the first set of one or more messages, and with an initial Big Data set with X-number of set members, wherein the X-number of set members in the Big Data set include telematic signature values collected from other drivers, wherein X is a positive number greater than at least 100,000, and with a plurality of Big Data set analytic methods, the initial Big Data set including a plurality of initial driver telematic signature information values created with the plurality of Big Data set analytic methods comprising: predictive analytic methods, driver behavior analytic methods, vehicle performance analytic methods, weather analytic methods, road condition analytic methods, terrain analytic methods and cultural analytic methods, the methods computing values for the initial Big Data set with the X-number of set members, the first driver telematic signature independent of how components in the first network device plugged into the port on the vehicle operate, or independent of how components the second network device within the vehicle operate, and independent of a vehicle type;

for adding with the SaaS to one or more cloud databases associated with the cloud server network device, the first driver telematic signature values to the initial Big Data creating a dynamic Big Data set;

for sending in real-time the first driver telematic signature with the first set of the plurality of telematic values in a first SaaS wireless message with the SaaS from the cloud server network device to the vehicle via the cloud communications network;

(a) for receiving continuously another set of one or more wireless messages on the SaaS on the cloud server network device via the cloud communications network from the vehicle;

(b) for creating continuously in real-time as long as the vehicle is on and is moving with an Artificial Intelligence (AI) application in real-time on the SaaS on the cloud server network device, a subsequent driver telematic signature, including another set of a plurality of telematic values for the driver of the vehicle comprising current driver performance data, current driver habit data and a current set of driver maneuvers, by analyzing via one or more AI methods on the AI application, with the information from the another set of the plurality of messages, with the dynamic Big Data set, and with the plurality of Big Data set analytic methods, the subsequent driver telematic signature also independent of how the components on the first network device plugged into the port on the vehicle operate, or also independent of how the components of the second network device within the vehicle operate and also independent of the vehicle type;

(c) for adding with the SaaS the another set of driver telematic signature values to the dynamic Big Data set stored in the one or more cloud databases associated with the SaaS on the cloud server network device;

(d) for sending in real-time the created subsequent driver telematic signature for the driver in another SaaS wireless message from the SaaS from the cloud server network device to the vehicle via the cloud communications network; and for repeating steps (a) through (d) in real-time as long as the vehicle is on and is moving, thereby providing a device-independent and vehicle-independent, AI analyzed and dynamic Big Data set calibrated, driver safety scoring system, with the SaaS on the cloud server network device and the cloud communications network.

\* \* \* \* \*